United States Patent
Locke et al.

(10) Patent No.: US 11,551,357 B2
(45) Date of Patent: Jan. 10, 2023

(54) SYSTEMS AND METHODS FOR PROCESSING IMAGES OF SLIDES FOR DIGITAL PATHOLOGY

(71) Applicant: PAIGE.AI, Inc., New York, NY (US)

(72) Inventors: Jason Locke, Westport, CT (US); Jillian Sue, New York, NY (US); Peter Schueffler, New York, NY (US); Jose Sebastian Izurieta-Herrera, Brooklyn, NY (US)

(73) Assignee: Paige.AI, Inc., New York, NY (US)

( * ) Notice: Subject to any disclaimer, the term of this patent is extended or adjusted under 35 U.S.C. 154(b) by 0 days.

(21) Appl. No.: 17/014,532

(22) Filed: Sep. 8, 2020

(65) Prior Publication Data
US 2021/0073984 A1 Mar. 11, 2021

Related U.S. Application Data

(60) Provisional application No. 62/897,745, filed on Sep. 9, 2019.

(51) Int. Cl.
*G06T 7/00* (2017.01)
*G06N 20/00* (2019.01)
(Continued)

(52) U.S. Cl.
CPC .......... *G06T 7/0012* (2013.01); *G06N 20/00* (2019.01); *G06T 3/40* (2013.01); *G06T 11/001* (2013.01);
(Continued)

(58) Field of Classification Search
None
See application file for complete search history.

(56) References Cited

U.S. PATENT DOCUMENTS 7,694,234 B2 * 4/2010 Fleisher ............... G06F 3/0481
715/801
9,256,917 B1 * 2/2016 Khafizova ............ G06F 3/0481
(Continued)

FOREIGN PATENT DOCUMENTS

WO WO-2008125870 A2 * 10/2008 ............. A61B 1/303
WO WO-2015069824 A2 * 5/2015 ........... G06K 9/6271
(Continued)

OTHER PUBLICATIONS

Chi, Jianning, et al. "Thyroid nodule classification in ultrasound images by fine-tuning deep convolutional neural network." Journal of digital imaging 30.4 (2017): 477-486. (Year: 2017).*
(Continued)

*Primary Examiner* — Samah A Beg
(74) *Attorney, Agent, or Firm* — Bookoff McAndrews, PLLC

(57) ABSTRACT

Systems and methods are disclosed for receiving a target electronic image corresponding to a target specimen, the target specimen comprising a tissue sample of a patient, applying a machine learning system to the target electronic image to determine at least one characteristic of the target specimen and/or at least one characteristic of the target electronic image, the machine learning system having been generated by processing a plurality of training images to predict at least one characteristic, the training images comprising images of human tissue and/or images that are algorithmically generated, and outputting the target electronic image identifying an area of interest based on the at least one characteristic of the target specimen and/or the at least one characteristic of the target electronic image.

20 Claims, 23 Drawing Sheets

(51) Int. Cl.
*G06T 3/40* (2006.01)
*G06T 11/00* (2006.01)
*G06V 10/25* (2022.01)

(52) U.S. Cl.
CPC .... *G06V 10/25* (2022.01); *G06T 2207/20081* (2013.01); *G06T 2207/30024* (2013.01)

(56) References Cited

U.S. PATENT DOCUMENTS

| | | | |
|---|---|---|---|
| 2004/0241730 A1* | 12/2004 | Yakhini | G16B 40/00 435/6.14 |
| 2009/0076368 A1* | 3/2009 | Balas | A61B 1/00149 600/407 |
| 2011/0060766 A1* | 3/2011 | Ehlke | G16H 30/00 715/810 |
| 2012/0069049 A1* | 3/2012 | Howe | G06T 7/0012 345/629 |
| 2012/0127297 A1* | 5/2012 | Baxi | G06K 9/036 348/79 |
| 2015/0317452 A1* | 11/2015 | Kozu | G16H 15/00 705/2 |
| 2016/0014343 A1* | 1/2016 | Kawano | H04N 5/2628 345/173 |
| 2016/0232425 A1* | 8/2016 | Huang | G06T 7/0012 |
| 2016/0335478 A1* | 11/2016 | Bredno | G06T 7/0012 |
| 2016/0381256 A1* | 12/2016 | Aguirre-Valencia | H04N 13/30 348/46 |
| 2017/0147174 A1* | 5/2017 | Olejniczak | G06K 9/3233 |
| 2017/0330327 A1* | 11/2017 | Ippolito | G02B 21/367 |
| 2018/0012355 A1* | 1/2018 | Sarkar | G06T 7/0012 |
| 2019/0197358 A1* | 6/2019 | Madani | G06T 7/0012 |
| 2019/0198156 A1* | 6/2019 | Madani | G06N 3/08 |
| 2019/0279362 A1* | 9/2019 | Marrero | G06K 9/6223 |
| 2020/0097727 A1* | 3/2020 | Stumpe | G02B 21/365 |
| 2020/0160032 A1* | 5/2020 | Allen | G06T 7/0012 |
| 2020/0258223 A1* | 8/2020 | Yip | G06K 9/628 |
| 2020/0302596 A1* | 9/2020 | Yoo | G06T 7/11 |
| 2021/0065372 A1* | 3/2021 | Zhuk | G06T 7/13 |
| 2021/0150707 A1* | 5/2021 | Weisenfeld | G06T 7/0012 |
| 2021/0350176 A1* | 11/2021 | Klaiman | G06V 10/454 |
| 2021/0407637 A1* | 12/2021 | Park | G16H 50/20 |
| 2022/0076410 A1* | 3/2022 | Georgescu | G06K 9/6257 |

FOREIGN PATENT DOCUMENTS

| | | | | |
|---|---|---|---|---|
| WO | WO-2016120463 A1 * | 8/2016 | | G06K 9/00127 |
| WO | WO 2019/160580 A1 | 8/2019 | | |

OTHER PUBLICATIONS

Schaer, Roger, et al. "Deep learning-based retrieval system for gigapixel histopathology cases and the open access literature." Journal of pathology informatics 10.1 (2019): 19. (Year: 2019).*

* cited by examiner

FIG. 9

PATHOLOGY CONSULTATION DASHBOARD

[SEARCH CONSULT CASES] 🔍

NEW REQUESTS

| PATIENT NAME | REFERRING PHYSICIAN | OUTSIDE ID | MSK ID | CLIENT INSTITUTION | DATE REQUESTED | STATUS | DATE UPDATED | DETAILS |
|---|---|---|---|---|---|---|---|---|
| K.D. | DR.C.J. | P14-1 | - ENTER ID - | GREENVILLE HOSPITAL | 7/1/2019 | NEW | 7/1/2019 | VIEW |
| L.J. | DR.C.J. | P14-2 | - ENTER ID - | GREENVILLE HOSPITAL | 6/29/2019 | NEW | 7/1/2019 | VIEW |
| C.B. | DR.C.J. | P14-3 | - ENTER ID - | GREENVILLE HOSPITAL | 6/16/2019 | NEW | 6/28/2019 | VIEW |
| L.B. | DR.C.J. | P14-4 | S19-5 | GREENVILLE HOSPITAL | 6/16/2019 | PENDING | 6/28/2019 | VIEW |

ACCESSIONED CONSULTS (LAST TWO WEEKS)

| PATIENT NAME | REFERRING PHYSICIAN | OUTSIDE ID | MSK ID | CLIENT INSTITUTION | DATE REQUESTED | STATUS | DATE UPDATED | DETAILS |
|---|---|---|---|---|---|---|---|---|
| W.C | DR.C.J. | P14-1 | S19 - 1 | GREENVILLE HOSPITAL | 6/7/2019 | ACCESSIONED | 7/9/2019 | VIEW |
| M.B. | DR.C.J. | P14-2 | S19 - 2 | GREENVILLE HOSPITAL | 5/29/2019 | ACCESSIONED | 6/1/2019 | VIEW |
| K.I. | DR.C.J. | P14-3 | S19 - 3 | GREENVILLE HOSPITAL | 5/16/2019 | CLOSED | 5/28/2019 | VIEW |
| K.M. | DR.C.J. | P14-4 | S19 - 4 | GREENVILLE HOSPITAL | 5/16/2019 | CLOSED | 5/28/2019 | VIEW |

*FIG. 16A*

PATHOLOGY CONSULTATION DASHBOARD

[ SEARCH CONSULT CASES ] 🔍

CONSULTATION REQUESTS

| PATIENT NAME | REFERRING PHYSICIAN | INSITUTION | DATE REQUESTED | STATUS | DATE UPDATED | DETAILS |
|---|---|---|---|---|---|---|
| K.D. | DR.C.J. | GREENVILLE HOSPITAL | 7/1/2019 | SUBMITTED | 7/1/2019 | VIEW |
| L.J. | DR.C.J. | GREENVILLE HOSPITAL | 6/29/2019 | ACCEPTED | 7/1/2019 | VIEW |
| C.B. | DR.C.J. | GREENVILLE HOSPITAL | 6/16/2019 | READY FOR REVIEW | 6/28/2019 | VIEW |
| L.B. | DR.C.J. | GREENVILLE HOSPITAL | 6/16/2019 | READY FOR REVIEW | 6/28/2019 | VIEW |

+ SUBMIT NEW CONSULTATION REQUEST

SYSTEMS AND METHODS FOR PROCESSING IMAGES OF SLIDES FOR DIGITAL PATHOLOGY

RELATED APPLICATION(S)

This application claims priority to U.S. Provisional Application No. 62/897,745 filed Sep. 9, 2019, the entire disclosure of which is hereby incorporated herein by reference in its entirety.

FIELD OF THE DISCLOSURE

Various embodiments of the present disclosure relate generally to image-based specimen analysis and related image processing methods. More specifically, particular embodiments of the present disclosure relate to systems and methods for identifying specimen properties and providing an integrated pathology workflow based on processing images of tissue specimens.

BACKGROUND

In order to use digital pathology images within a hospital or in research environments, it can be important to identify and categorize a specimen's tissue type, the nature of the specimen's acquisition (e.g., prostate needle biopsy, breast biopsy, breast resection, etc.), and other relevant properties of the specimen or the image.

A desire exists for a way to provide an integrated pathology workflow based on processing images of tissue specimens. The following disclosure is directed to systems and methods for providing user interfaces and artificial intelligence (AI) tools that may be integrated into a workflow to expedite and improve a pathologist's work solutions.

The foregoing general description and the following detailed description are exemplary and explanatory only and are not restrictive of the disclosure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for identifying specimen properties and providing an integrated pathology workflow based on processing images of tissue specimens.

A computer-implemented method for analyzing an electronic image corresponding to a specimen includes: receiving a target electronic image corresponding to a target specimen, the target specimen comprising a tissue sample of a patient; applying a machine learning system to the target electronic image to determine at least one characteristic of the target specimen and/or at least one characteristic of the target electronic image, the machine learning system having been generated by processing a plurality of training images to predict at least one characteristic, the training images comprising images of human tissue and/or images that are algorithmically generated; and outputting the target electronic image identifying an area of interest based on the at least one characteristic of the target specimen and/or the at least one characteristic of the target electronic image.

A system for analyzing an electronic image corresponding to a specimen includes: a memory storing instructions; and a processor executing the instructions to perform a process including receiving a target electronic image corresponding to a target specimen, the target specimen comprising a tissue sample of a patient; applying a machine learning system to the target electronic image to determine at least one characteristic of the target specimen and/or at least one characteristic of the target electronic image, the machine learning system having been generated by processing a plurality of training images to predict at least one characteristic, the training images comprising images of human tissue and/or images that are algorithmically generated; and outputting the target electronic image identifying an area of interest based on the at least one characteristic of the target specimen and/or the at least one characteristic of the target electronic image.

A non-transitory computer-readable medium storing instructions that, when executed by processor, cause the processor to perform a method for analyzing an image corresponding to a specimen, the method includes receiving a target electronic image corresponding to a target specimen, the target specimen comprising a tissue sample of a patient; applying a machine learning system to the target electronic image to determine at least one characteristic of the target specimen and/or at least one characteristic of the target electronic image, the machine learning system having been generated by processing a plurality of training images to predict at least one characteristic, the training images comprising images of human tissue and/or images that are algorithmically generated; and outputting the target electronic image identifying an area of interest based on the at least one characteristic of the target specimen and/or the at least one characteristic of the target electronic image.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 9 illustrates an exemplary output of an annotation tool of the viewing application tool 101, according to an exemplary embodiment of the present disclosure.

FIG. 17 illustrates an exemplary output of a case view for the viewing application tool 101, according to an exemplary embodiment of the present disclosure.

DESCRIPTION OF THE EMBODIMENTS

Figure 1A:
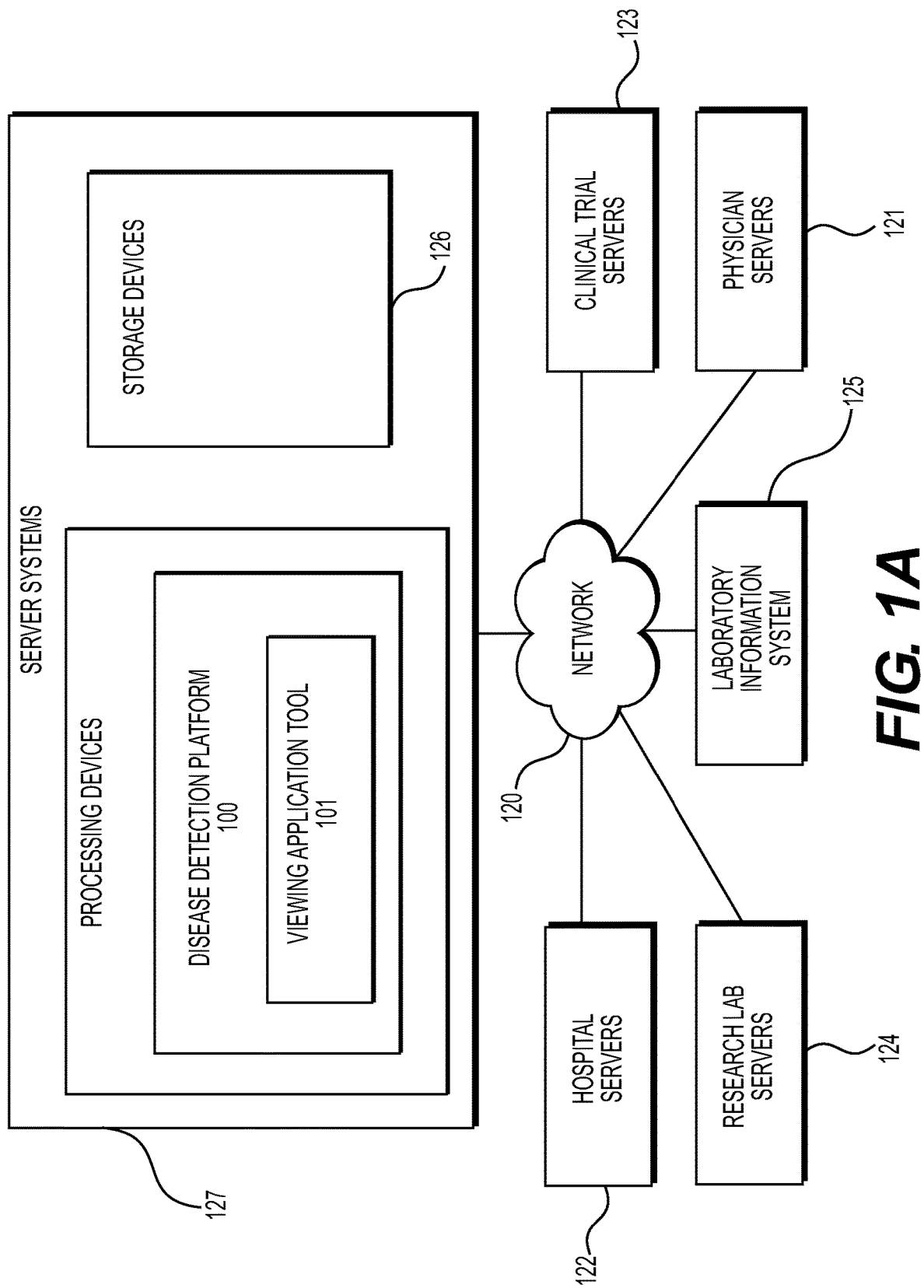
FIG. 1A illustrates an exemplary block diagram of a system and network for determining specimen property or image property information pertaining to digital pathology image(s), according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Pathology refers to the study of diseases. More specifically, pathology refers to performing tests and analysis that are used to diagnose diseases. For example, tissue samples may be placed onto slides to be viewed under a microscope by a pathologist (e.g., a physician that is an expert at analyzing tissue samples to determine whether any abnormalities exist). That is, pathology specimens may be cut into multiple sections, stained, and prepared as slides for a pathologist to examine and render a diagnosis. When uncertain of a diagnostic finding on a slide, a pathologist may order additional cut levels, stains, or other tests to gather more information from the tissue. Technician(s) may then create new slide(s) which may contain the additional information for the pathologist to use in making a diagnosis. This process of creating additional slides may be time-consuming, not only because it may involve retrieving the block of tissue, cutting it to make a new a slide, and then staining the slide, but also because it may be batched for multiple orders. This may significantly delay the final diagnosis that the pathologist renders. In addition, even after the delay, there may still be no assurance that the new slide(s) will have information sufficient to render a diagnosis.

Computers may be used to analyze an image of a tissue sample to quickly identify whether additional information may be needed about a particular tissue sample, and/or to highlight to a pathologist an area in which he or she may need to look more closely. Thus, the process of obtaining additional stained slides and tests may be done automatically before being reviewed by a pathologist. When paired with automatic slide segmenting and staining machines, this may provide a fully automated slide preparation pipeline. This automation has, at least, the benefits of (1) minimizing an amount of time spent by a pathologist determining a slide to be insufficient to make a diagnosis, (2) minimizing the (average total) time from specimen acquisition to diagnosis by avoiding the additional time between when additional tests are ordered and when they are produced, (3) reducing the amount of time per recut and the amount of material wasted by allowing recuts to be done while tissue blocks (e.g., pathology specimens) are in a cutting desk, (4) reducing the amount of tissue material needed during slide preparation, (5) reducing the cost of slide preparation by partially or fully automating the procedure, (6) allowing automatic customized cutting and staining of slides that would result in more representative/informative slides from samples, (7) allowing higher volumes of slides to be generated per tissue block, contributing to more informed/precise diagnoses by reducing the overhead of requesting additional testing for a pathologist, and/or (8) identifying or verifying correct properties (e.g., pertaining to a specimen type) of a digital pathology image, etc.

The process of using computers to assist pathologists is known as computational pathology. Computing methods used for computational pathology may include, but are not limited to, statistical analysis, autonomous or machine learning, and AI. AI may include, but is not limited to, deep learning, neural networks, classifications, clustering, and regression algorithms. By using computational pathology, lives may be saved by helping pathologists improve their diagnostic accuracy, reliability, efficiency, and accessibility. For example, computational pathology may be used to assist with detecting slides suspicious for cancer, thereby allowing pathologists to check and confirm their initial assessments before rendering a final diagnosis.

Histopathology refers to the study of a specimen that has been placed onto a slide. For example, a digital pathology image may be comprised of a digitized image of a microscope slide containing the specimen (e.g., a smear). One method a pathologist may use to analyze an image on a slide is to identify nuclei and classify whether a nucleus is normal (e.g., benign) or abnormal (e.g., malignant). To assist pathologists in identifying and classifying nuclei, histological stains may be used to make cells visible. Many dye-based staining systems have been developed, including periodic acid-Schiff reaction, Masson's trichrome, nissl and methylene blue, and Haemotoxylin and Eosin (H&E). For medical diagnosis, H&E is a widely used dye-based method, with hematoxylin staining cell nuclei blue, eosin staining cytoplasm and extracellular matrix pink, and other tissue regions taking on variations of these colors. In many cases, however, H&E—stained histologic preparations do not provide sufficient information for a pathologist to visually identify biomarkers that can aid diagnosis or guide treatment. In this situation, techniques such as immunohistochemistry (IHC), immunofluorescence, in situ hybridization (ISH), or fluorescence in situ hybridization (FISH), may be used. IHC and immunofluorescence involve, for example, using antibodies that bind to specific antigens in tissues enabling the visual detection of cells expressing specific proteins of interest, which can reveal biomarkers that are not reliably identifiable to trained pathologists based on the analysis of H&E stained slides. ISH and FISH may be employed to assess the number of copies of genes or the abundance of specific RNA molecules, depending on the type of probes employed (e.g. DNA probes for gene copy number and RNA probes for the assessment of RNA expression). If these methods also fail to provide sufficient information to detect some biomarkers, genetic testing of the tissue may be used to confirm if a biomarker is present (e.g., overexpression of a specific protein or gene product in a tumor, amplification of a given gene in a cancer).

A digitized image may be prepared to show a stained microscope slide, which may allow a pathologist to manually view the image on a slide and estimate a number of stained abnormal cells in the image. However, this process may be time consuming and may lead to errors in identifying abnormalities because some abnormalities are difficult to detect. Computational processes and devices may be used to assist pathologists in detecting abnormalities that may otherwise be difficult to detect. For example, AI may be used to predict biomarkers (such as the over-expression of a protein and/or gene product, amplification, or mutations of specific genes) from salient regions within digital images of tissues stained using H&E and other dye-based methods. The images of the tissues could be whole slide images (WSI), images of tissue cores within microarrays or selected areas of interest within a tissue section. Using staining methods like H&E, these biomarkers may be difficult for humans to visually detect or quantify without the aid of additional testing. Using AI to infer these biomarkers from digital images of tissues has the potential to improve patient care, while also being faster and less expensive.

The detected biomarkers or the image alone could then be used to recommend specific cancer drugs or drug combination therapies to treat a patient, and the AI could identify which drugs or drug combinations are likely to be successful by correlating the detected biomarkers with a database of treatment options. This can be used to facilitate the automatic recommendation of immunotherapy drugs to target a patient's specific cancer. Further, this could be used for enabling personalized cancer treatment for specific subsets of patients and/or rarer cancer types.

In the field of pathology today, it may be difficult to provide systematic quality control ("QC"), with respect to pathology specimen preparation, and quality assurance ("QA") with respect to the quality of diagnoses, throughout the histopathology workflow. Systematic quality assurance is difficult because it is resource and time intensive as it may require duplicative efforts by two pathologists. Some methods for quality assurance include (1) second review of first-time diagnosis cancer cases; (2) periodic reviews of discordant or changed diagnoses by a quality assurance committee; and (3) random review of a subset of cases. These are non-exhaustive, mostly retrospective, and manual. With an automated and systematic QC and QA mechanism, quality can be ensured throughout the workflow for every case. Laboratory quality control and digital pathology quality control may be important to the successful intake, process, diagnosis, and archive of patient specimens. Manual and sampled approaches to QC and QA confer substantial benefits. Systematic QC and QA has the potential to provide efficiencies and improve diagnostic quality.

As described above, computational pathology processes and devices of the present disclosure may provide an integrated platform allowing a fully automated process including data ingestion, processing and viewing of digital pathology images via a web-browser or other user interface, while integrating with a laboratory information system (LIS). Further, clinical information may be aggregated using cloud-based data analysis of patient data. The data may come from hospitals, clinics, field researchers, etc., and may be analyzed by machine learning, computer vision, natural language processing, and/or statistical algorithms to do real-time monitoring and forecasting of health patterns at multiple geographic specificity levels.

The present disclosure presents a consolidated workflow for facilitating disease detection and/or cancer diagnosis, by providing a workflow that integrates, for example, slide evaluation, tasks, image analysis and cancer detection AI, annotations, consultations, and recommendations in one workstation. The present disclosure describes various exemplary user interfaces available in the workflow, as well as AI tools that may be integrated into the workflow to expedite and aid a pathologist's work.

FIG. 1A illustrates a block diagram of a system and network for providing a workflow for determining and outputting specimen property or image property information pertaining to digital pathology image(s), using machine learning, according to an exemplary embodiment of the present disclosure.

Specifically, FIG. 1A illustrates an electronic network 120 that may be connected to servers at hospitals, laboratories, and/or doctors' offices, etc. For example, physician servers 121, hospital servers 122, clinical trial servers 123, research lab servers 124, and/or laboratory information systems 125, etc., may each be connected to an electronic network 120, such as the Internet, through one or more computers, servers, and/or handheld mobile devices. According to an exemplary embodiment of the present application, the electronic network 120 may also be connected to server systems 127, which may include processing devices that are configured to implement a disease detection platform 100, which includes a viewing application tool 101 for determining and outputting specimen property or image property information pertaining to digital pathology image(s), and using machine learning, according to an exemplary embodiment of the present disclosure.

The physician servers 121, hospital servers 122, clinical trial servers 123, research lab servers 124, and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124, and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124, and/or laboratory information systems 125 may transmit digitized slide images and/or patient-specific information to server systems 127 over the electronic network 120. Server system(s) 127 may include one or more storage devices 126 for storing images and data received from at least one of the physician servers 121, hospital servers 122, clinical trial servers 123, research lab servers 124, and/or laboratory information systems 125. Server systems 127 may also include processing devices for processing images and data stored in the storage devices 126. Server systems 127 may further include one or more machine learning tool(s) or capabilities. For example, the processing devices may include a machine learning tool for a disease detection platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124, and/or laboratory information systems 125 refer to systems used by pathologists for reviewing the images of the slides. In hospital settings, tissue type information may be stored in a LIS 125. However, the correct tissue classification information is not always paired with the image content. Additionally, even if an LIS is used to access the specimen type for a digital pathology image, this label may be incorrect due to the fact that many components of an LIS may be manually inputted, leaving a large margin for error. According to an exemplary embodiment of the present disclosure, a specimen type and/or other specimen information may be identified without needing to access the LIS 125, or may be identified to possibly correct LIS 125. For example, a third party may be given anonymized access to the image content without the corresponding specimen type label stored in the LIS. Additionally, access to LIS content may be limited due to its sensitive content.

Figure 1B:
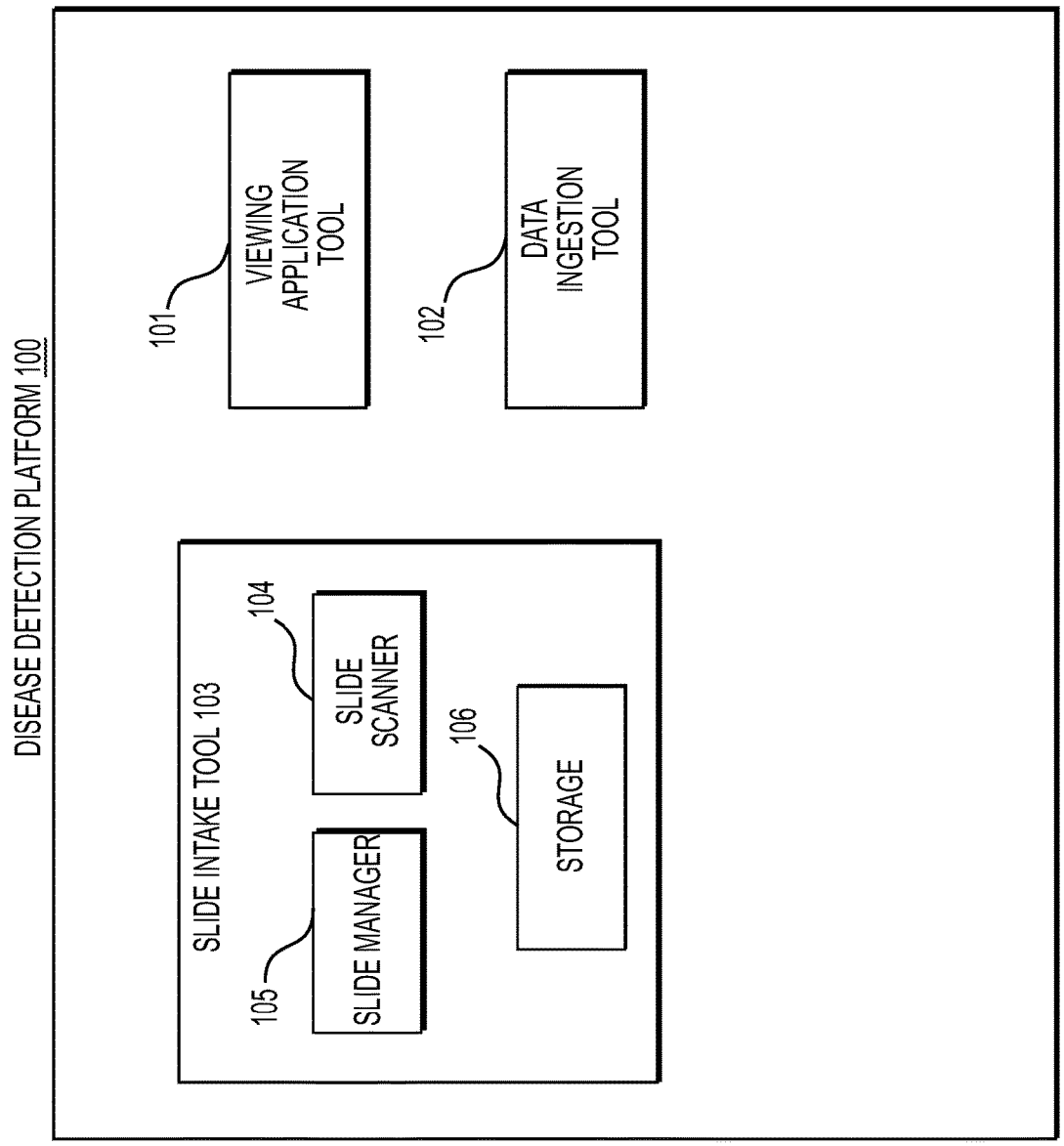
FIG. 1B illustrates an exemplary block diagram of a disease detection platform 100, according to an exemplary embodiment of the present disclosure.

FIG. 1B illustrates an exemplary block diagram of a disease detection platform 100 for determining and outputting specimen property or image property information pertaining to digital pathology image(s), using machine learning.

Specifically, FIG. 1B depicts components of the disease detection platform 100, according to one embodiment. For example, the disease detection platform 100 may include a viewing application tool 101, a data ingestion tool 102, a slide intake tool 103, a slide scanner 104, a slide manager 105, and/or a storage 106.

The viewing application tool 101, as described below, may refer to a process and system for providing a user (e.g., a pathologist) with specimen property and/or image property information pertaining to digital pathology image(s), according to an exemplary embodiment. The information may be provided through various output interfaces (e.g., a screen, a monitor, a storage device, and/or a web browser, etc.).

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 101, and each of its components, may transmit and/or receive digitized slide images and/or patient information to server systems 127, physician servers 121, hospital servers 122, clinical trial servers 123, research lab servers 124, and/or laboratory information systems 125 over a network 120. Further, server systems 127 may include storage devices for storing images and data received from at least one of the viewing application tool 101, the data ingestion tool 102, the slide intake tool 103, the slide scanner 104, and/or the slide manager 105. Server systems 127 may also include processing devices for processing images and data stored in the storage devices. Server systems 127 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools, and modules may be located on a device that may be connected to an electronic network 120, such as the Internet or a cloud service provider, through one or more computers, servers, and/or handheld mobile devices.

Figure 1C:
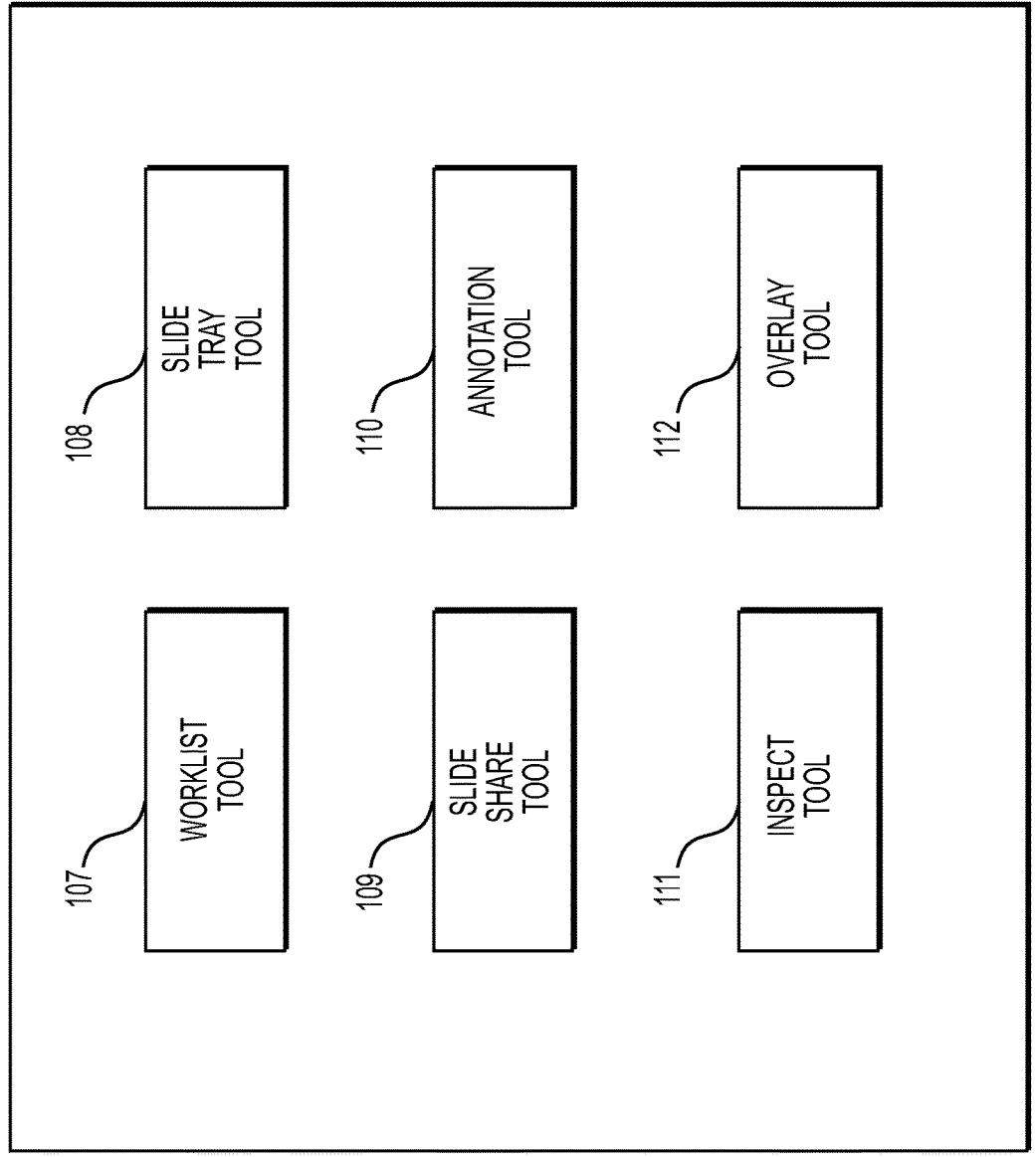
FIG. 1C illustrates an exemplary block diagram of a viewing application tool 101, according to an exemplary embodiment of the present disclosure.

FIG. 1C illustrates an exemplary block diagram of a viewing application tool 101, according to an exemplary embodiment of the present disclosure. The viewing application tool 101 may include a worklist tool 107, a slide tray tool 108, a slide share tool 109, and annotation tool 110, an inspect tool 111, and/or an overlay tool 112. The worklist tool 107 may provide an overview of an end-to-end workflow for slide viewing and/or case management. The slide tray tool 108 may organize a case's slides in parts and provide high-level case information including case number, demographic information, etc. A slide share tool 109 may provide a user with the ability to share various slides and include and/or write a brief comment about the nature of the share. The annotation tool 110 may include a brush tool, auto brush tool, loci tool, pinning tool, arrow tool, text field tool, detail area tool, ROI tool, prediction tool, measure tool, mufti measure tool, comment tool, and/or screenshot tool. The inspect tool 111 may provide an inspection window that features a magnified view of an area of interest for the target image. The overlay tool may provide a heat map overlay on a magnified view of an area of interest for the target image identifying areas of interest on the tissue specimen of the magnified view of the target image.

Figure 1D:
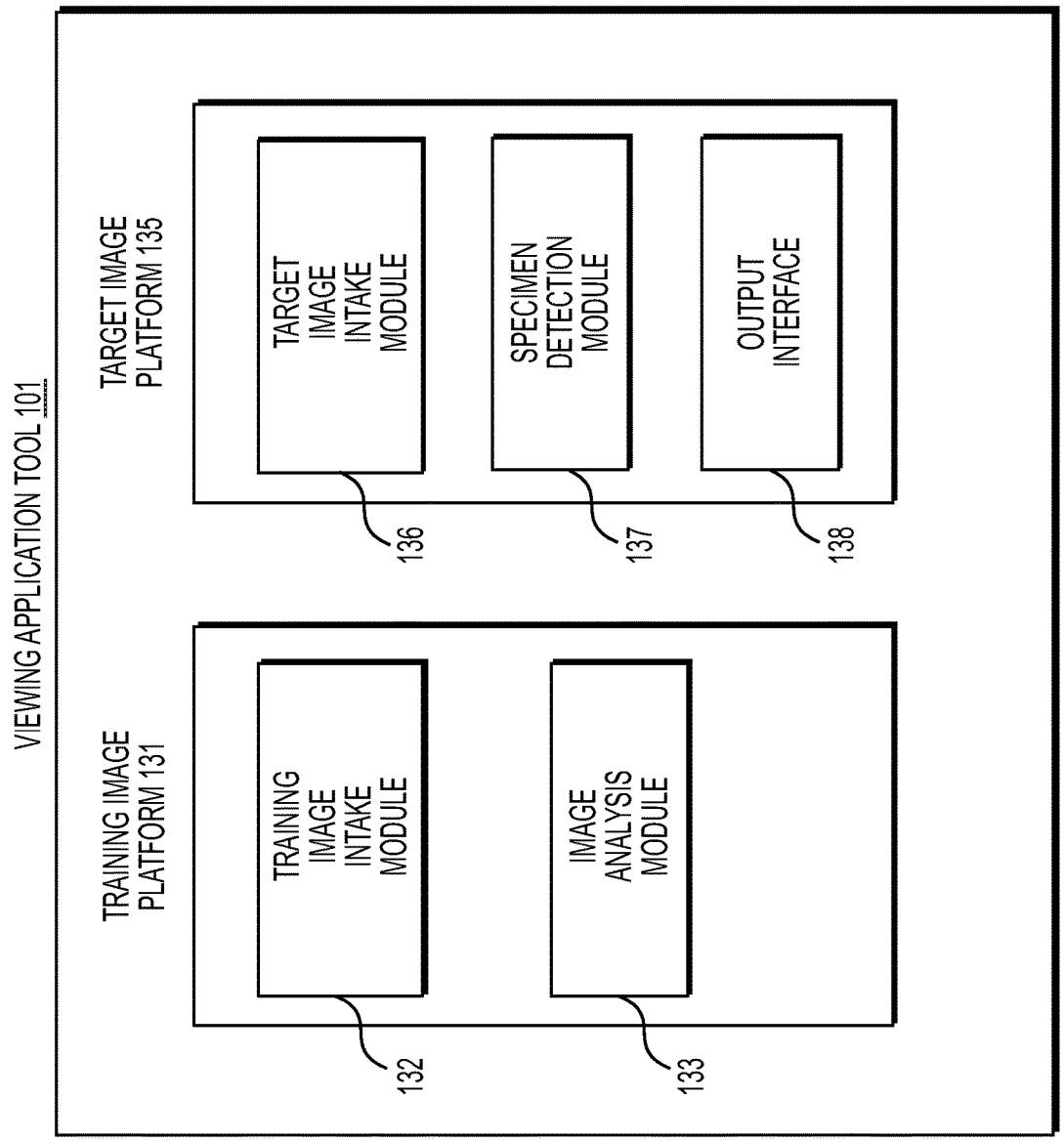
FIG. 1D illustrates an exemplary block diagram of a viewing application tool 101, according to an exemplary embodiment of the present disclosure.

FIG. 1D illustrates an exemplary block diagram of a viewing application tool 101, according to an exemplary embodiment of the present disclosure. The viewing application tool 101 may include a training image platform 131 and/or a target image platform 135.

According to one embodiment, the training image platform 131 may include a training image intake module 132 and/or an image analysis module 133.

The training image platform 131, according to one embodiment, may create or receive training images that are used to train a machine learning system to effectively analyze and classify digital pathology images. For example, the training images may be received from any one or any combination of the server systems 127, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized tissue samples from a 3D imaging device, such as microCT.

The training image intake module 132 may create or receive a dataset comprising one or more training images corresponding to either or both of images of a human tissue and images that are graphically/synthetically rendered. For example, the training images may be received from any one or any combination of the server systems 127, physician servers 121, hospital servers 122, clinical trial servers 123, research lab servers 124, and/or laboratory information systems 125. This dataset may be kept on a digital storage device. The image analysis module 133 may analyze the image to identify specimen property and/or image property information (e.g., the specimen type, the overall quality of the cut of the specimen, the overall quality of the glass pathology slide itself, and/or tissue morphology characteristics)

According to one embodiment, the target image platform 135 may include a target image intake module 136, a specimen detection module 137, and an output interface 138. The target image platform 135 may receive a target image and apply the machine learning system to the received target image to determine a characteristic of a target specimen. For example, the target image may be received from any one or any combination of the server systems 127, physician servers 121, hospital servers 122, clinical trial servers 123, research lab servers 124, and/or laboratory information systems 125. The target image intake module 136 may receive a target image corresponding to a target specimen. The specimen detection module 137 may apply the machine learning system to the target image to determine a characteristic of the target specimen and/or a characteristic of the target image. For example, the specimen detection module 137 may detect a specimen type of the target specimen. Further, the specimen detection module 137 may apply the machine learning system to determine whether an area of the specimen includes one or more abnormalities.

The output interface 138 may be used to output information about the target image and the target specimen. (e.g., to a screen, monitor, storage device, web browser, etc.).

Figure 2:
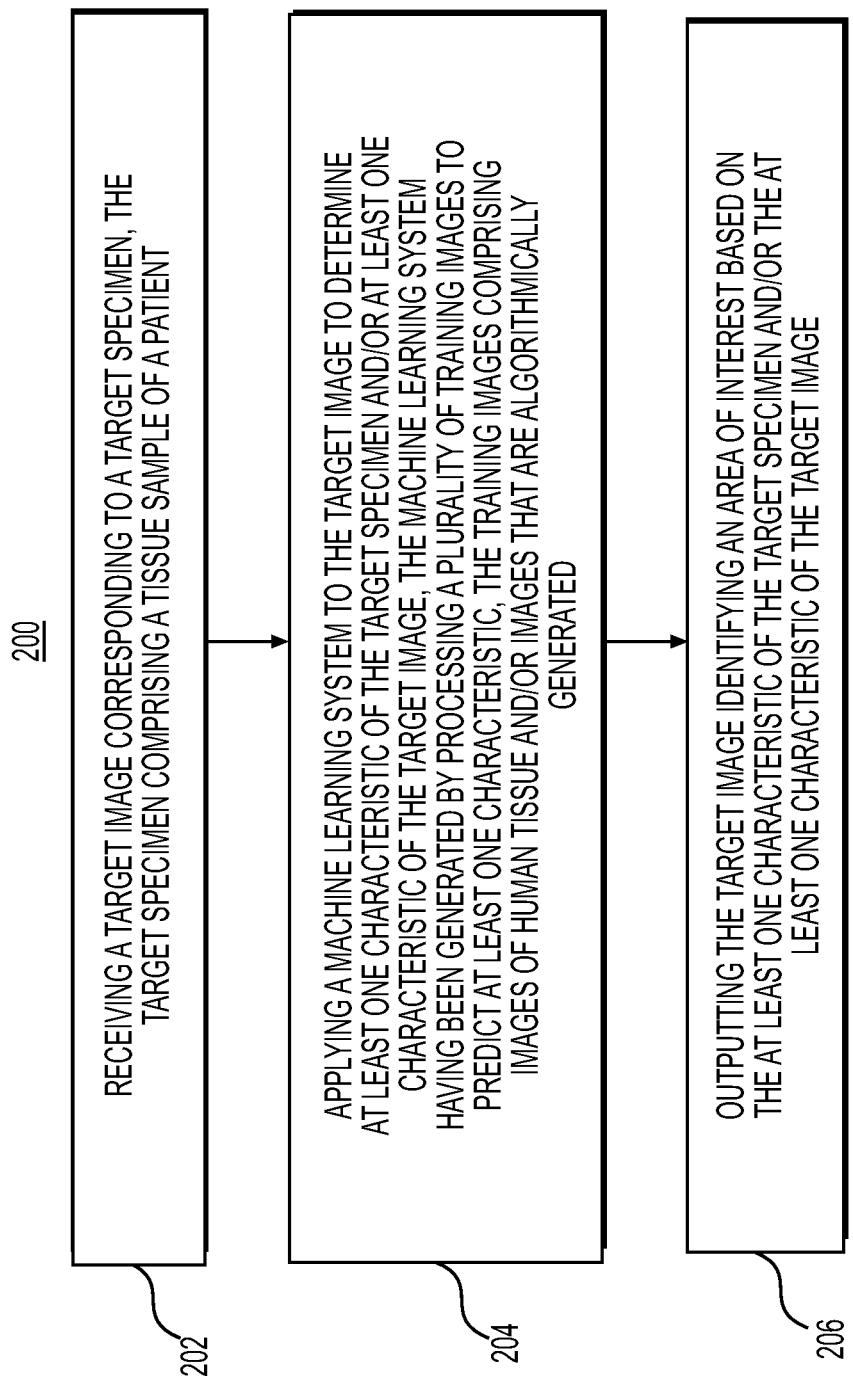
FIG. 2 is a flowchart illustrating an exemplary method for outputting a target image identifying an area of interest, according to one or more exemplary embodiments of the present disclosure.

FIG. 2 is a flowchart illustrating an exemplary method of providing a viewing application tool 101 for identifying specimen information and providing a user interface for viewing the specimen information, according to an exemplary embodiment of the present disclosure. For example, an exemplary method 200 (e.g., steps 202 to 206) may be performed by the viewing application tool 101 automatically or in response to a request from a user (e.g., physician, pathologist, technician, etc.).

According to one embodiment, the exemplary method 200 for identifying specimen information and providing a user interface for viewing the specimen information may include one or more of the following steps. In step 202, the method may include receiving a target image corresponding to a target specimen, the target specimen comprising a tissue sample of a patient. For example, the target image may be received from any one or any combination of the server systems 127, physician servers 121, hospital servers 122, clinical trial servers 123, research lab servers 124, and/or laboratory information systems 125.

In step 204, the method may include applying a machine learning system to the target image to determine at least one characteristic of the target specimen and/or at least one characteristic of the target image. Determining the characteristic of the target specimen may include determining specimen information of the target specimen. For example, determining the characteristic may include determining whether there is an abnormality in the target specimen.

The machine learning system may have been generated by processing a plurality of training images to predict at least one characteristic, and the training images may include images of human tissue and/or images that are algorithmically/synthetically generated. The machine learning system may be implemented using machine learning methods for classification and regression. Training inputs could include real or synthetic imagery. Training inputs might or might not be augmented (e.g., adding noise or creating variants of the input by flipping/distortions). Exemplary machine learning systems may include, but are not limited to, any one or any combination of Neural Networks, Convolutional neural networks, Random Forest, Logistic Regression, and Nearest Neighbor. Convolutional neural networks can directly learn the image feature representations necessary for discriminating among characteristics, which can work extremely well when there are large amounts of data to train on for each specimen, whereas the other methods can be used with either traditional computer vision features, e.g., speeded up robust features (SURF) or scale-invariant feature transform (SIFT), or with learned embeddings (e.g., descriptors) produced by a trained convolutional neural network, which can yield advantages when there are only small amounts of data to train on. The training images may be received from any one or any combination of the server systems 127, physician servers 121, hospital servers 122, clinical trial servers 123, research lab servers 124, and/or laboratory information systems 125. This dataset may be kept on a digital storage device. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, IHC, molecular pathology, etc.; and/or (b) digitized tissue samples from a 3D imaging device, such as microCT.

In step 206, the method may include outputting the target image identifying an area of interest based on the at least one characteristic of the target specimen and/or the at least one characteristic of the target image.

Different methods for implementing machine learning algorithms and/or architectures may include but are not limited to (1) CNN (Convolutional Neural Network); (2) MIL (Multiple Instance Learning); (3) RNN (Recurrent Neural Network); (4) Feature aggregation via CNN; and/or (5) Feature extraction following by ensemble methods (e.g., random forest), linear/non-linear classifiers (e.g., SVMs (support vector machines), MLP (multiplayer perceptron), and/or dimensionality reduction techniques (e.g., PCA (principal component analysis), LDA (linear discriminant analysis), etc.). Example features may include vector embeddings from a CNN, single/multi-class output from a CNN, and/or multi-dimensional output from a CNN (e.g., a mask overlay of the original image). A CNN may learn feature representations for classification tasks directly from pixels, which may lead to better diagnostic performance. When detailed annotations for regions or pixel-wise labels are available, a CNN may be trained directly if there is a large amount of labeled data. However, when labels are only at the whole slide level or over a collection of slides in a group (which may be called a "part" in pathology), MIL may be used to train the CNN or another neural network classifier, where MIL learns the image regions that are diagnostic for the classification task leading to the ability to learn without exhaustive annotations. An RNN may be used on features extracted from multiple image regions (e.g., tiles) that it then processes to make a prediction. Other machine learning methods, e.g., random forest, SVM, and numerous others may be used with either features learned by a CNN, a CNN with MIL, or using hand-crafted image features (e.g., SIFT or SURF) to do the classification task, but they may perform poorly when trained directly from pixels. These methods may perform poorly compared to CNN-based systems when there is a large amount of annotated training data available. Dimensionality reduction techniques could be used as a pre-processing step before using any of the classifiers mentioned, which could be useful if there was little data available.

According to one or more embodiments, any of the above algorithms, architectures, methodologies, attributes, and/or features may be combined with any or all of the other algorithms, architectures, methodologies, attributes, and/or features. For example, any of the machine learning algorithms and/or architectures (e.g., neural network methods, convolutional neural networks (CNNs), recurrent neural networks (RNNs), etc.) may be trained with any of the training methodologies (e.g., Multiple Instance Learning, Reinforcement Learning, Active Learning, etc.)

The description of the terms below is merely exemplary and is not intended to limit the terms in any way.

A label may refer to information about an input to a machine learning algorithm that the algorithm is attempting to predict.

For a given image of size N×M, a segmentation may be another image of size N×M that, for each pixel in an original image, assigns a number that describes the class or type of that pixel. For example, in a WSI, elements in the mask may categorize each pixel in the input image as belonging to the classes of, e.g., background, tissue and/or unknown.

Slide level information may refer to information about a slide in general, but not necessarily a specific location of that information in the slide.

A heuristic may refer to a logic rule or function that deterministically produces an output, given inputs. For example: if a prediction that a slide has an abnormality present, then output one, if not, output 0.

Embedding may refer to a conceptual high-dimensional numerical representation of low-dimensional data. For example, if a WSI is passed through a CNN training to classify tissue type, the numbers on the last layer of the network may provide an array of numbers (e.g., in the order of thousands) that contain information about the slide (e.g., information about a type of tissue).

Slide level prediction may refer to a concrete prediction about a slide as a whole. For example, a slide level prediction may be that the slide contains an abnormality. Further, slide level prediction may refer to individual probability predictions over a set of defined classes.

A classifier may refer to a model and/or system that is trained to take input data and associate it with a category.

According to one or more embodiments, the machine learning model and/or system may be trained in different ways. For example, the training of the machine learning model may be performed by any one or any combination of supervised training, semi-supervised training, unsupervised training classifier training, mixed training, and/or uncertainty estimation. The type of training used may depend on an amount of data, a type of data, and/or a quality of data. Table 1 below describes a non-limiting list of some types of training and the corresponding features.

TABLE 1

| Index | Input | Label | Model | Output |
|---|---|---|---|---|
| 1 | WSI Embedding | Segmentation | CNN, RNN, MLP | Predicted Segmentation Embedding |
| 2 | WSI Embedding | Slide Level Information | CNN, RNN, MLP | Embedding Slide level prediction |
| 3 | WSI Embedding | — | CNN, RNN, MLP | Embedding |
| 4 | Embedding | Slide Level Information | SVM, MLP, RNN, Random Forests | Slide level prediction |
| 5 | Slide level prediction | Measure of how wrong the prediction was | MLP, RNN, Statistical Model | Predict a likelihood that an original prediction is wrong |

Supervised training may be used with a small amount of data to provide a seed for a machine learning model. In supervised training, the machine learning model may look for a specific item (e.g., bubbles, tissue folds, etc.), flag the slide, and quantify how much of the specific item is present in the slide.

According to one embodiment, an example fully supervised training may take as an input a WSI and may include a label of segmentation. Pipelines for a fully supervised training may include (1) 1; (2) 1, Heuristic; (3) 1, 4, Heuristic; (4) 1, 4, 5, Heuristic; and/or (5) 1, 5, Heuristic. Advantages of a fully supervised training may be that (1) it may require fewer slides and/or (2) the output is explainable because it may be known which areas of the image contributed to the diagnosis. A disadvantage of using a fully supervised training may be that it may require large amounts of segmentation which may be difficult to acquire.

According to one embodiment, an example semi-supervised (e.g., weakly supervised) training may take as an input WSI and may include a label of slide level information. Pipelines for a semi-supervised training may include (1) 2; (2) 2, Heuristic; (3) 2, 4, Heuristic; (4) 2, 4, 5, Heuristic; and/or (5) 2, 5, Heuristic. Advantages of using a semi-supervised training may be that (1) the types of labels required may be present in many hospital records; and (2) output is explainable because it may be known which areas of the image contributed most to the diagnosis. A disadvantage of using a semi-supervised training is that it may be difficult to train. For example, the system may need to use a training scheme such as Multiple Instance Learning, Activate Learning, and/or distributed training to account for the fact that there is limited information about where in the slide the information is that should lead to a decision.

According to one embodiment, an example unsupervised training may take as an input a WSI and may require no label. The pipelines for an unsupervised training may include (1) 3, 4; and/or (2) 3, 4, Heuristic. An advantage of unsupervised training may be that it does not require any labels. Disadvantages of using an unsupervised training may be that (1) it may be difficult to train. For example, it may need to use a training scheme such as Multiple Instance Learning, Activate Learning, and/or distributed training to account for the fact that there is limited information about where in the slide the information is that should lead to a decision; (2) it may require additional slides; and/or (3) it may be less explainable because it might output a prediction and probability without explaining why that prediction was made.

According to one embodiment, an example mixed training may include training any of the example pipelines described above for fully supervised training, semi-supervised training, and/or unsupervised training, and then use the resulting model as an initial point for any of the training methods. Advantages of mixed training may be that (1) it may require less data; (2) it may have improved performance; and/or (3) it may allow a mixture of different levels of labels (e.g., segmentation, slide level information, no information). Disadvantages of mixed training may be that (1) it may be more complicated and/or expensive to train; and/or (2) it may require more code that may increase a number and complexity of potential bugs.

According to one embodiment, an example uncertainty estimation may include training any of the example pipelines described above for fully supervised training, semi-supervised training, and/or unsupervised training, for any task related to slide data using uncertainty estimation in the end of the pipeline. Further, a heuristic or classifier may be used to predict whether a slide has an abnormality based on an amount of uncertainty in the prediction of the test. An advantage of uncertainty estimation may be that it is robust to out-of-distribution data. For example, when unfamiliar data is presented, it may still correctly predict that it is uncertain. Disadvantages of uncertainty estimation may be that (1) it may need more data; (2) it may have poor overall performance; and/or (3) it may be less explainable because the model might not necessarily identify how a slide or slide embedding is abnormal.

According to one embodiment, an ensembles training may include simultaneously running models produced by any of the example pipelines described above, and combining the outputs by a heuristic or a classifier to produce robust and accurate results. Advantages of ensembles training may be that (1) it is robust to out-of-distribution data; and/or (2) it may combine advantages and disadvantages of other models, resulting in a minimization of disadvantages (e.g., a supervised training model combined with an uncertainty estimation model, and a heuristic that uses a supervised model when incoming data is in distribution and uses an uncertainty model when data is out of distribution, etc.). Disadvantages of ensembles training may be that (1) it may be more complex; and/or (2) it may be expensive to train and run.

Training techniques discussed herein may also proceed in stages, where images with greater annotations are initially used for training, which may allow for more effective later training using slides that have fewer annotations, are less supervised, etc.

Training may begin using the slides that are the most thoroughly annotated, relative to all the training slide images that may be used. For example, training may begin using supervised learning. A first set of slides images may be received or determined with associated annotations. Each slide may have marked and/or masked regions and may include information such as whether the slide has an abnormality. The first set of slides may be provided to a training algorithm, for example a CNN, which may determine correlations between the first set of slides and their associated annotations.

After training with the first set of images is completed, a second set of slide images may be received or determined having fewer annotations than the first set, for example with partial annotations. In one embodiment, the annotations might only indicate that the slide has a diagnosis or quality issue associated with it, but might not specify what or where disease may be found, etc. The second set of slide images may be trained using a different training algorithm than the first, for example Multiple Instance Learning. The first set of training data may be used to partially train the system, and may make the second training round more effective at producing an accurate algorithm.

In this way, training may proceed in any number of stages, using any number of algorithms, based on the quality and types of the training slide images. These techniques may be utilized in situations where multiple training sets of images are received, which may be of varying quality, annotation levels, and/or annotation types.

Figure 3:
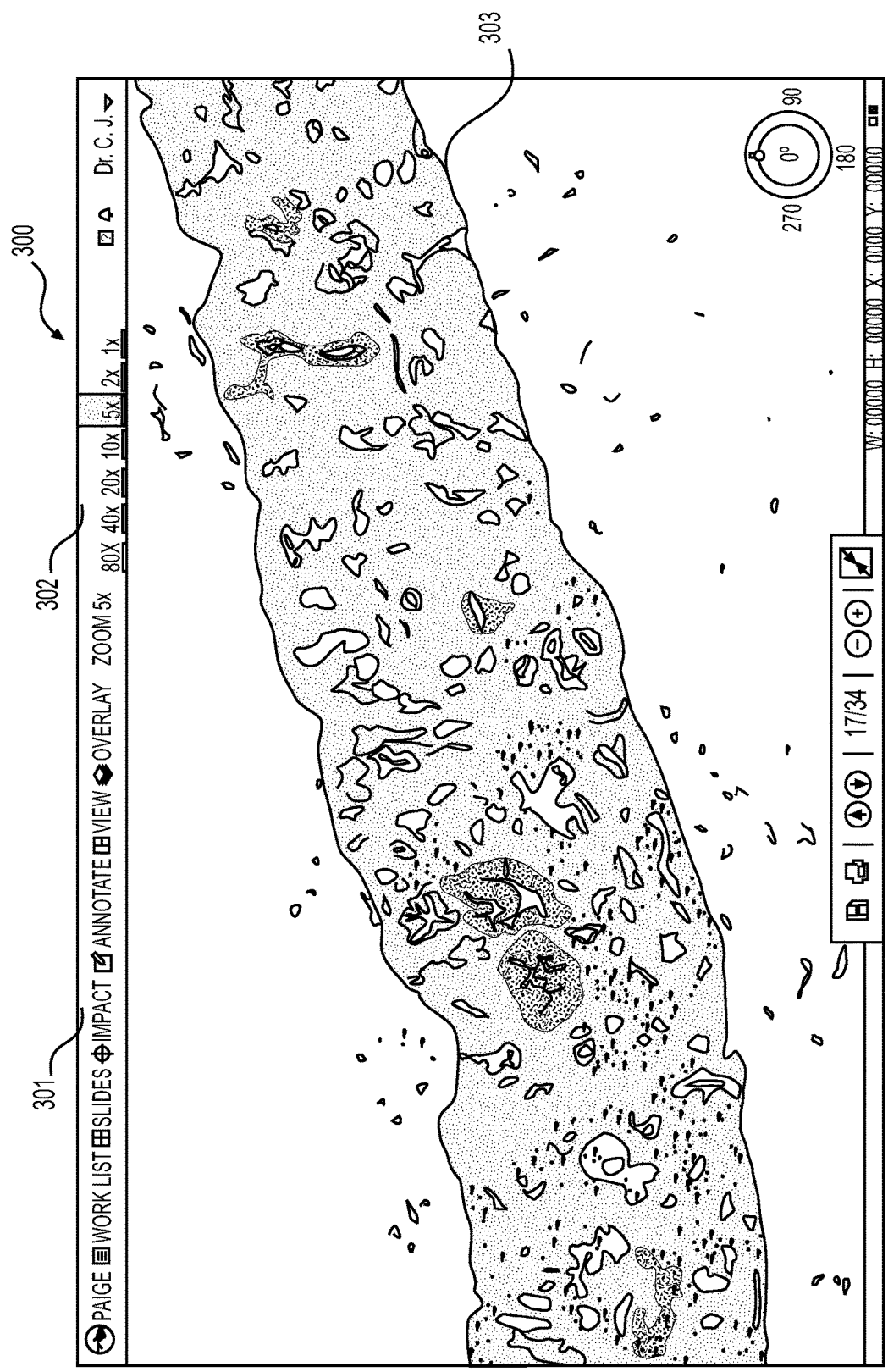
FIG. 3 illustrates an exemplary output of the viewing application tool 101, according to an exemplary embodiment of the present disclosure.

FIG. 3 illustrates an exemplary output 300 of the viewing application tool 101, according to an exemplary embodiment. As illustrated in FIG. 3, the viewing application tool 101 may include a navigation menu 301 for navigating to a worklist view for the worklist tool 107, a sides view for the slide tray tool 108 and the slide share tool 109, the annotation tool 110, the inspect tool 111, and/or an overlay toggle for the overlay tool 112. The navigation menu 301 may also include a view modes input for adjusting the view (e.g., splitting the screens to view multiple slides and/or stains at once). A zoom menu 302 may be used for quickly adjusting the zoom level of the target image 303. The target image may be displayed in any color. For example, a dark, neutral color scheme may be used to display the details of the target image 303. The viewing application tool 101 may include a positive/negative indicator for whether possible disease is present at an (x, y) coordinate in the image. Additionally, a confirmation and/or edit of the positive/negative indicator may be performed by a user.

The slides may be prioritized using a prioritization feature, based on characteristics identified in the target image. The slides may be organized using a folder system that includes a default system and a custom system. The viewing application tool 101 may include a case view that may include results, notes, attachments, patient information, and status icons. The slides in a case may be organized by type, and may be color-coded. A case sharing function may be designed to be safe and trusted. The cases may be archived to provide necessary storage space. There may be functionality for switching between masses within a single slide. The viewing application tool 101 may provide notifications for new messages and/or new slides. A status icon may indicate whether a case and/or slide is new, and whether it has been shared and/or ordered. There may be functionality for searching cases, patients, and/or projects. The viewing application tool 101 may include a patient queue and/or a consult queue.

The viewing application tool 101 may include viewing options, which may include viewing mode, window, rotation, scale bar and/or overlays. An exemplary output of the viewing application tool 101 may include patient information, slide information (e.g., image overview), and/or file information (e.g., slide map). The viewing modes may include a default view, and viewing modes for different ratios. The viewing application tool 101 may include a fluorescent mode, a magnifier view, a scale bar, a pan and zoom function, a rotate image function, a focus of interest, and/or other slide actions (e.g., order new stains). The viewing application may analyze an image and determine a survival rate of the patient.

The viewing application tool 101 may include functionality for ordering slides and levels, and for recommending slides. For example, the viewing application tool 101 may include options for selecting a slide type, sending a new slide order, receiving slide order confirmation, a slide ordered indicator, viewing new slides, and/or comparing new slides with a previous slide. The viewing application tool 101 may also include functionality for recommending levels and selecting the levels.

The viewing application tool 101 may include functionality for searching similar cases with the viewing application tool 101, according to an exemplary embodiment. For example, an area of interest may be identified, the area of interest may be rotated and quantified, and cases with a similar area of interest may be identified and attached to a patient case.

The viewing application tool 101 may include functionality for providing a mitosis count. For example, an area of interest may be identified, the area of interest may be moved/rotated and quantified, and cases with a similar area of interest may be identified and attached to a patient case. The viewing application tool 101 may display the count results, including number of mitoses and/or visual markers. An identified region may be zoomed into, and the count results may be confirmed and/or edited by a user. The results may be shared across the system.

Figure 4:
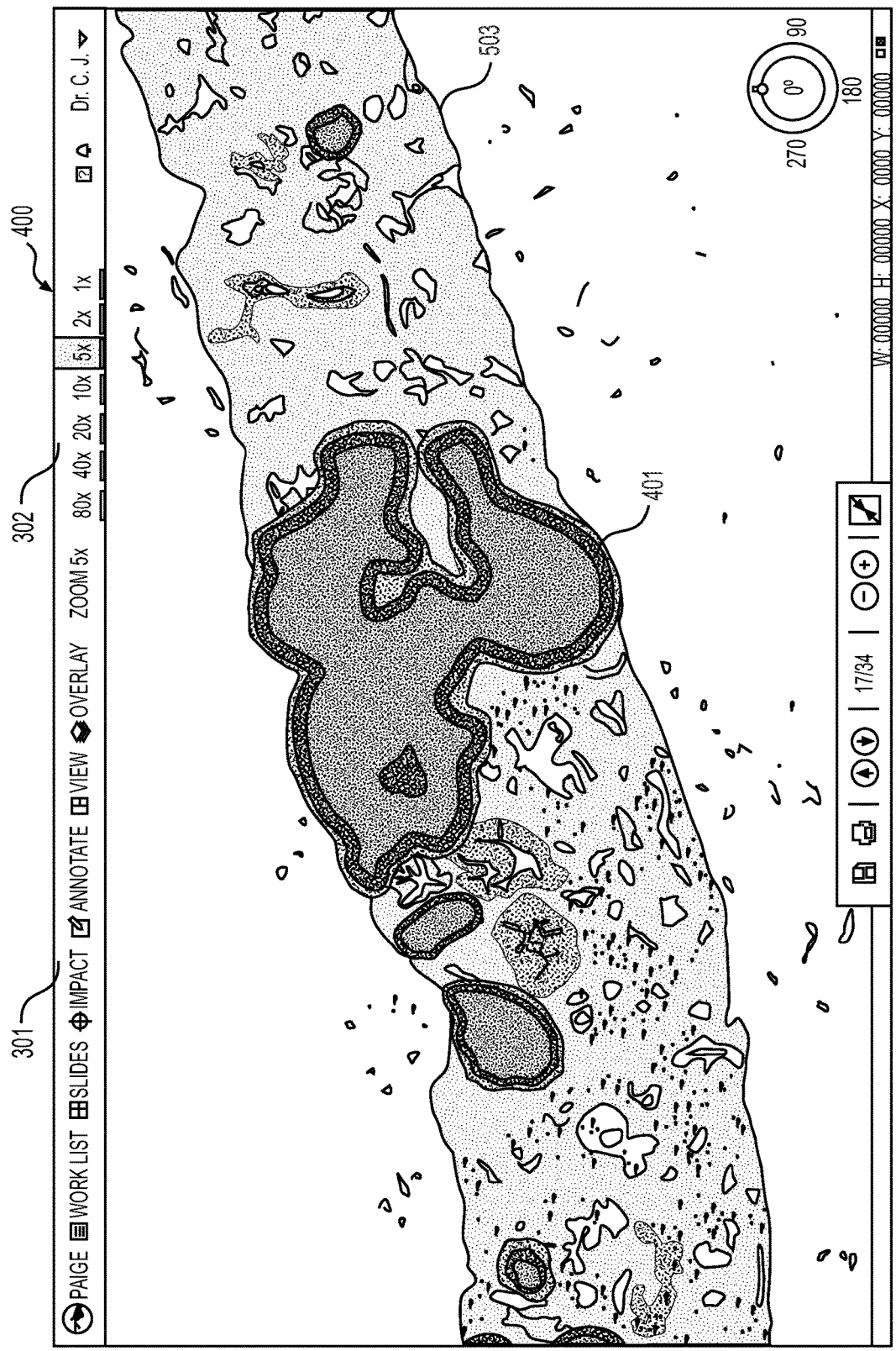
FIG. 4 illustrates an exemplary output of an overlay tool of the viewing application tool 101, according to an exemplary embodiment of the present disclosure.

FIG. 4 illustrates an exemplary output 400 of the overlay tool 112 of the viewing application tool 101, according to an exemplary embodiment. The overlay tool 112 may provide a heat map overlay 401 on the target image 303. The heat map overlay may identify areas of interest on the tissue specimen of the target image. For example, the heat map overlay may identify an area in which the AI system predicts that there may be an abnormality in the tissue specimen. The prediction heat map overlay visualization may be toggled on and off using the navigation menu 301. For example, a user may select an overlay icon on the navigation menu to toggle on or off a heat map overlay. The prediction heat map interface may indicate to users (e.g., pathologists) one or more areas on the tissue that a user should inspect. The heat map overlay may be transparent and/or translucent so the user may see the underlying tissue while viewing the heat map overlay. The heat map overlay may include different colors and/or shading to indicate a severity of a detected disease. Other types of overlay may be available in context to the type of tissue being viewed. For example, FIG. 4 illustrates a prostate biopsy. However, other diseases may require different visualization or AI systems relevant to them.

Figure 5:
FIG. 5 illustrates an exemplary output of a worklist tool of the viewing application tool 101, according to an exemplary embodiment of the present disclosure.

FIG. 5 illustrates an exemplary output 500 of the worklist tool 107 of the viewing application tool 101, according to an exemplary embodiment. As illustrated in FIG. 5, the viewing application tool 101 may include a worklist 501 that may be opened by selecting a worklist icon in the navigation menu 301. The main navigation menu 301 may provide an overview of an end-to-end workflow for slide viewing and/or case management. For example, the overview may include a worklist 501 that may display all of a user's (e.g., pathologist) cases. This may be accessed from the viewer user interface (UI) by opening the worklist panel. Within the worklist panel, a pathologist can view a patient's medical record number (MRN), patient ID number, patient name, the type of disease suspected, the status of the case, the Surgical Date and select from various case actions, such as view case details, case sharing, and/or searching, etc.

Figure 6:
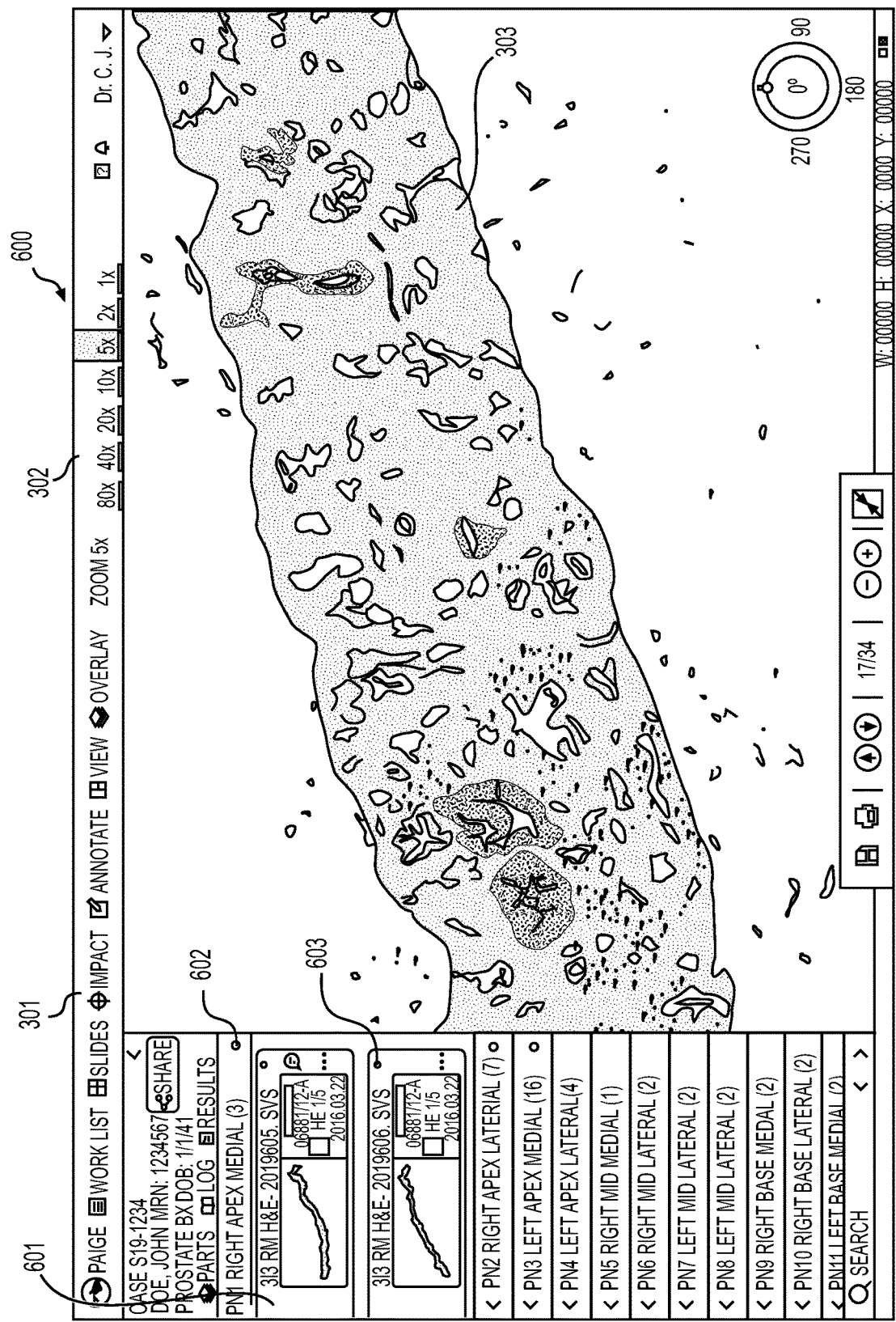
FIG. 6 illustrates an exemplary output of a slide tray tool of the viewing application tool 101, according to an exemplary embodiment of the present disclosure.

FIG. 6 illustrates an exemplary output 600 of the slide tray tool 108 of the viewing application tool 101, according to an exemplary embodiment. As illustrated in FIG. 6, a slides icon in the navigation menu 301 may open a slide tray 601 as a drawer/dropdown from a menu on the left of a screen. The menu may present high-level case information including case number, demographic information, etc. A case's slides may be organized in parts, represented in slide tray 601 as parent tabs in dark grey. Each part may expand to display the slides within it. Accordingly, slides that are determined to be associated with the same part, which may be a predetermined area of the sample, or predetermined sample area of the patient, may be displayed within a predetermined proximity of each other. A red dot 602, which may be a different color or different shape of indicator, on a part may indicate that the AI system has found possible disease (e.g., cancer) somewhere within that part. A red dot 603 on a slide may indicate that the AI system has discovered possible disease somewhere on that slide. These parts and slides where the AI system has found possible disease may be brought to the top of a list for immediate viewing by a user (e.g., pathologist). This workflow may assist a pathologist to identify a disease quicker.

Figure 7:
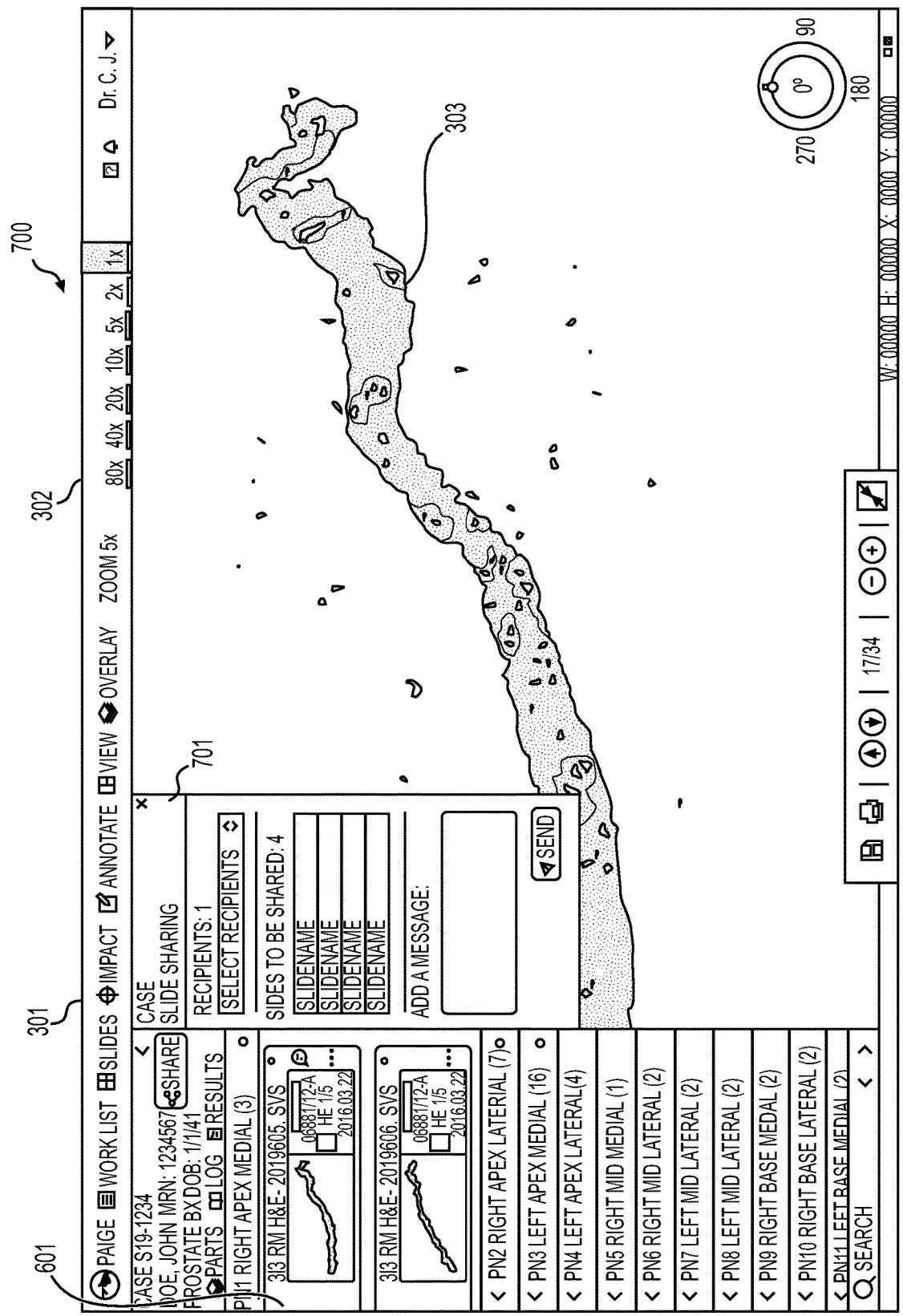
FIG. 7 illustrates an exemplary output of a slide share tool of the viewing application tool 101, according to an exemplary embodiment of the present disclosure.

FIG. 7 illustrates an exemplary output 700 of the slide share tool 109 of the viewing application tool 101, according to an exemplary embodiment. From the slides panel, a user may select the "Share" button and select single, multiple, and/or all slides for sharing. The slide sharing panel 701 may be positioned to the right of the slide tray 601 and may allow a user to enter the recipients of the sharing, select the various slides to include and/or write a brief comment about the nature of the share. Once the send button is selected, the slides and brief comment may be sent to recipients who may receive notifications to view these slides and/or comment in their viewing application. The dialogue between users may be captured in a log described below.

Figure 8:
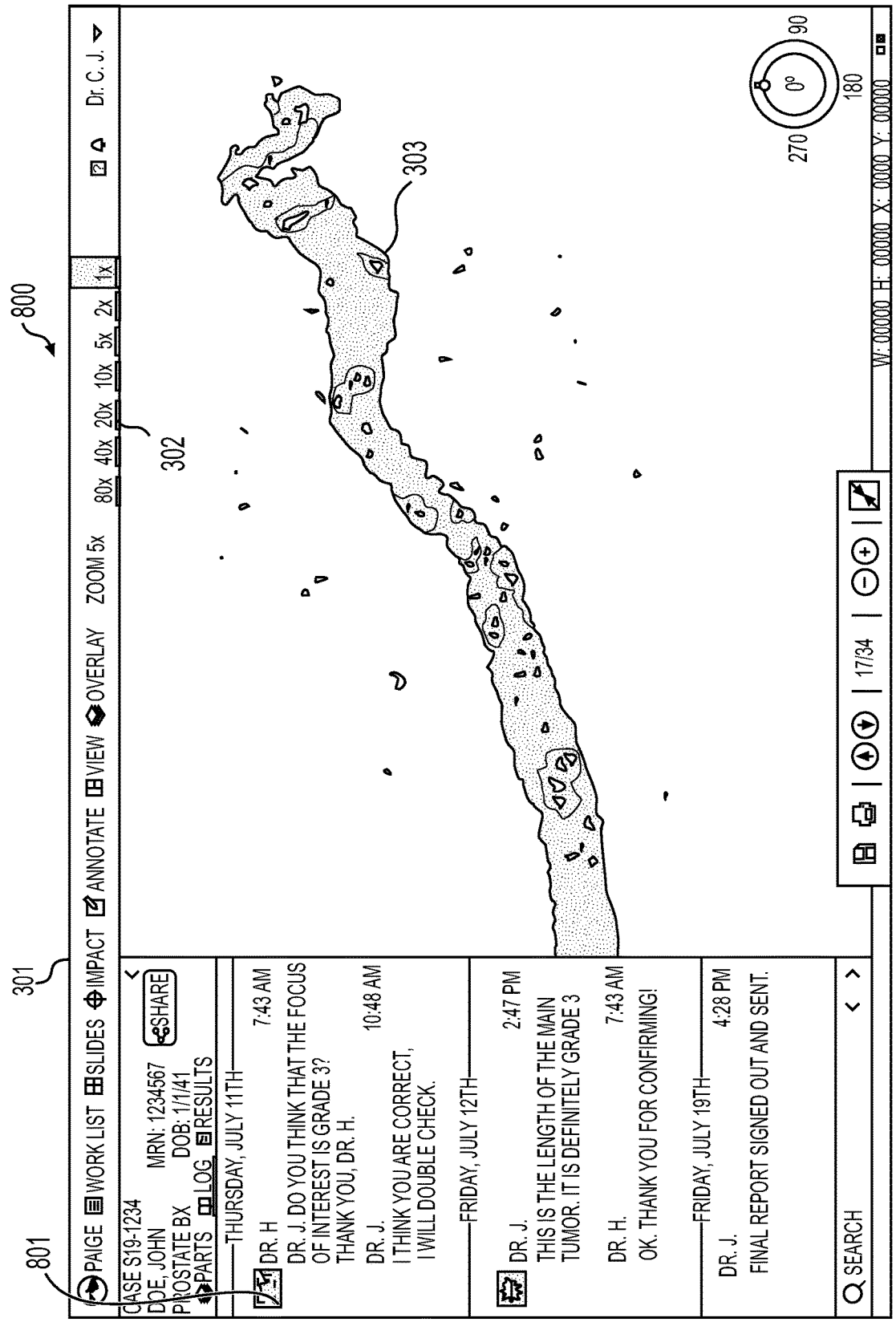
FIG. 8 illustrates an exemplary output of an annotation tool of the viewing application tool 101, according to an exemplary embodiment of the present disclosure.

FIG. 8 illustrates an exemplary output 800 of the annotation tool 110 of the viewing application tool 101, according to an exemplary embodiment. For each annotation made, an annotation log 801 may capture a visual of the actual annotation made, the type of annotation, any measurements, comments, the user who made the annotation and/or the time of the annotation. The annotation log 801 may serve as a centralized view for consultation and informal sharing to be reviewed within the context of an annotation or area of interest. A user (e.g., pathologist) requesting a consultation and the consulting pathologist may read, make comments, and/or have an ongoing dialogue specific to each annotation, each with a time stamp. Users may also select the thumbnails within the annotation log 801 to view that area of interest in large scale within a main viewer window.

Figure 9:
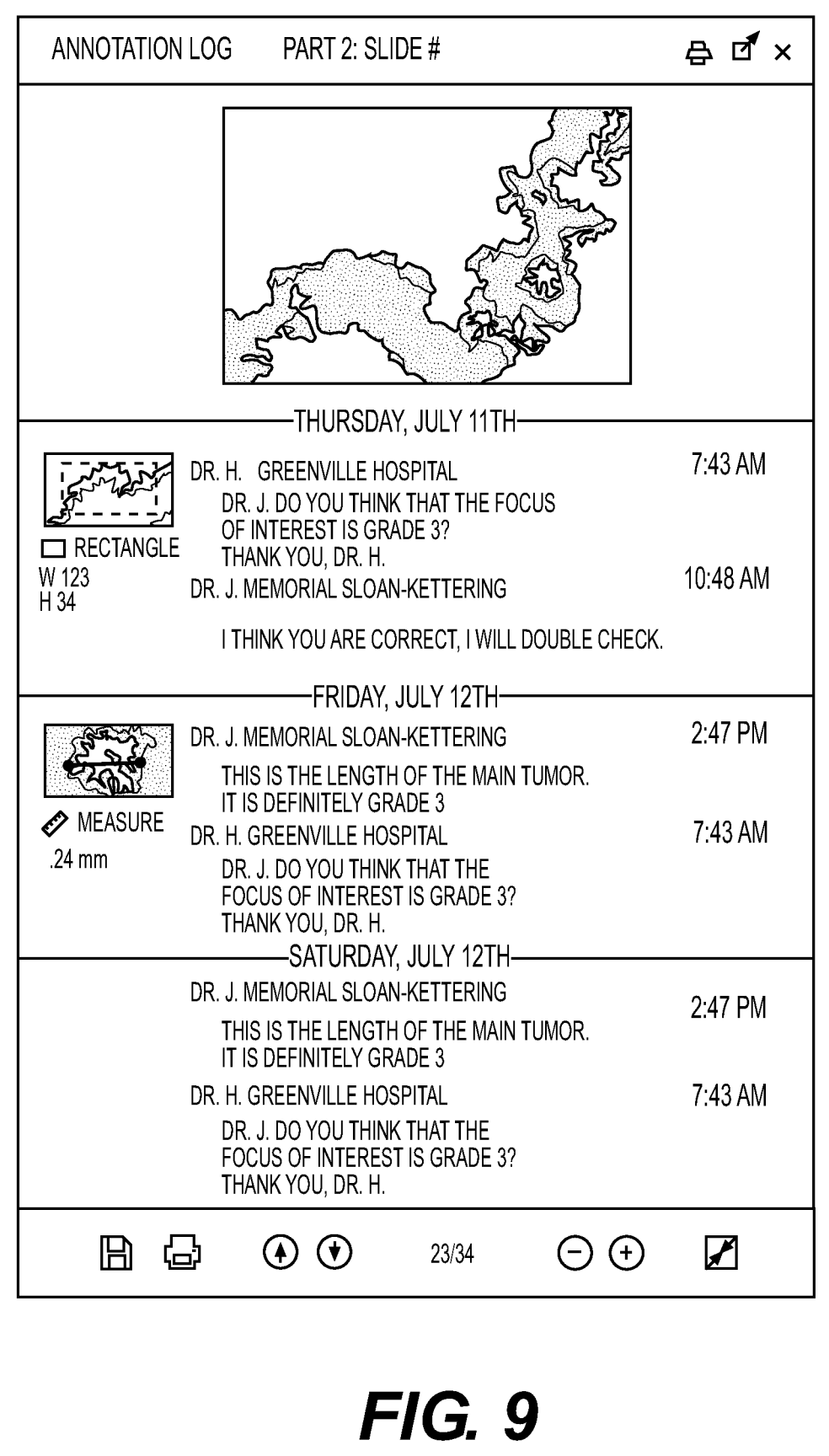

FIG. 9 illustrates an exemplary output of the annotation tool 110 of the viewing application tool 101, according to an exemplary embodiment. For example, the annotation log illustrated in FIG. 9 includes a dialogue between pathologists to discuss a slide. The pathologists may send notes along with an annotated image to quickly consult about any areas of interest on the slide.

Figure 10:
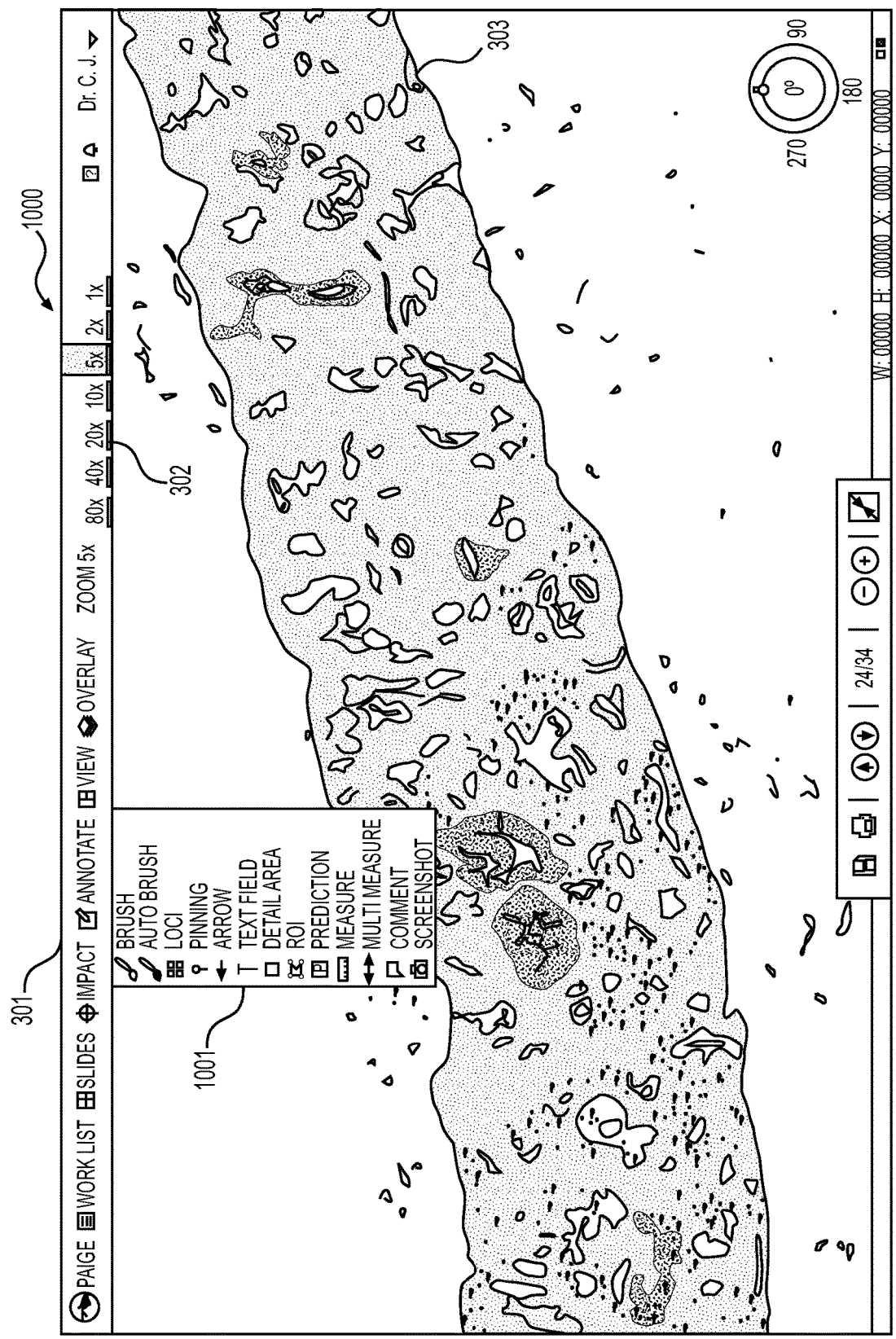
FIG. 10 illustrates an exemplary output of an annotation tool of the viewing application tool 101, according to an exemplary embodiment of the present disclosure.

FIG. 10 illustrates an exemplary output 1000 of the annotation tool 110 of the viewing application tool 101, according to an exemplary embodiment. The viewing application may include a variety of annotation tools illustrated in annotation menu 1001. For example, the annotation tools may include a brush tool, auto brush tool, loci tool, pinning tool, arrow tool, text field tool, detail area tool, ROI tool, prediction tool, measure tool, multi measure tool, draw area of focus tool, region of interest tool, add tag tool, comment tool, and/or screenshot tool. The annotations may be used for research purposes and/or in a clinical setting. For example, a pathologist may make an annotation, write a comment, and/or share it with a colleague to get a second opinion. The annotations may also be used in a final diagnostic report as supporting evidence of the diagnosis (e.g., the tumor is x length, has y number mitotic count, etc.)

Figure 11:
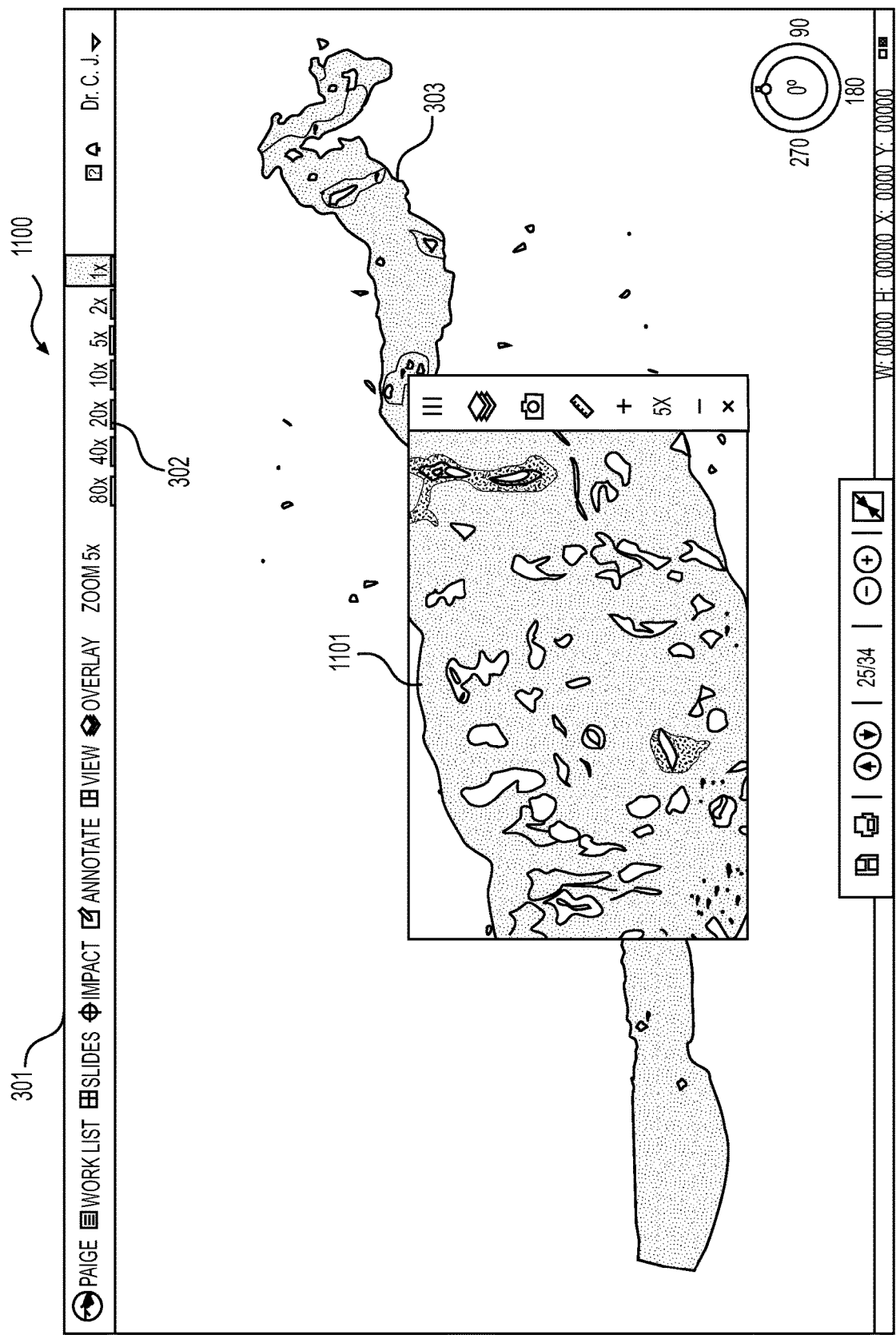
FIG. 11 illustrates an exemplary output of an inspect tool of the viewing application tool 101, according to an exemplary embodiment of the present disclosure.

FIG. 11 illustrates an exemplary output 1100 of the inspect tool 111 of the viewing application tool 101, according to an exemplary embodiment. The inspect tool 111 may include an inspection window 1101 that features a magnified view of an area of interest for the target image. Based on a user input, the inspection window may be dragged across the image to quickly survey the image. Thus, a pathologist may be able to quickly move across a slide in a fashion similar to how slides are moved currently in microscopy. The user may quickly switch or toggle the prediction heat map overlay on and off while viewing through the inspect tool 111. The user may take screenshots of the tissue viewable within the inspect tool and quickly share the screenshots. Different annotation tools may also be available with the inspect tool, such as a measurement tool and/or highlighting of an area. Additionally, a user may increase and decrease magnification within the inspect tool, independent of the main slide's magnification level.

Figure 12:
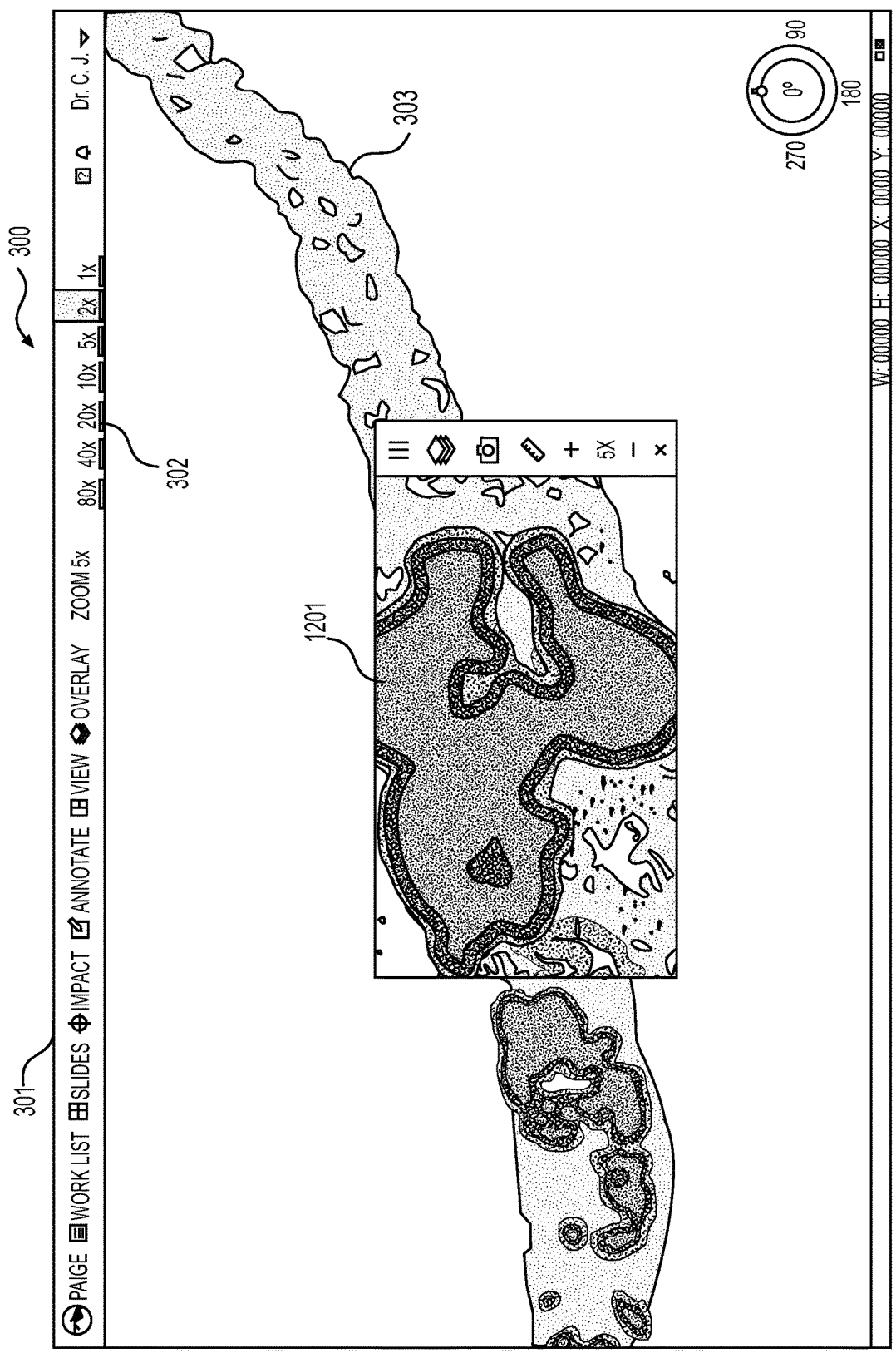
FIG. 12 illustrates an exemplary output of an inspect tool of the viewing application tool 101, according to an exemplary embodiment of the present disclosure.

FIG. 12 illustrates an exemplary output 1200 of the inspect tool 111 of the viewing application tool 101, according to an exemplary embodiment. As illustrated in FIG. 12, the inspection window 1201 may display AI outputs in the magnified view for validation and assistance in diagnosis. The inspection window 1201 may include a heat map overlay that displays the characteristics of the tissue specimen predicted by the AI system. For example, the heat map overlay may identify an area in which the AI system predicts that there may be an abnormality in the tissue specimen.

Figure 13:
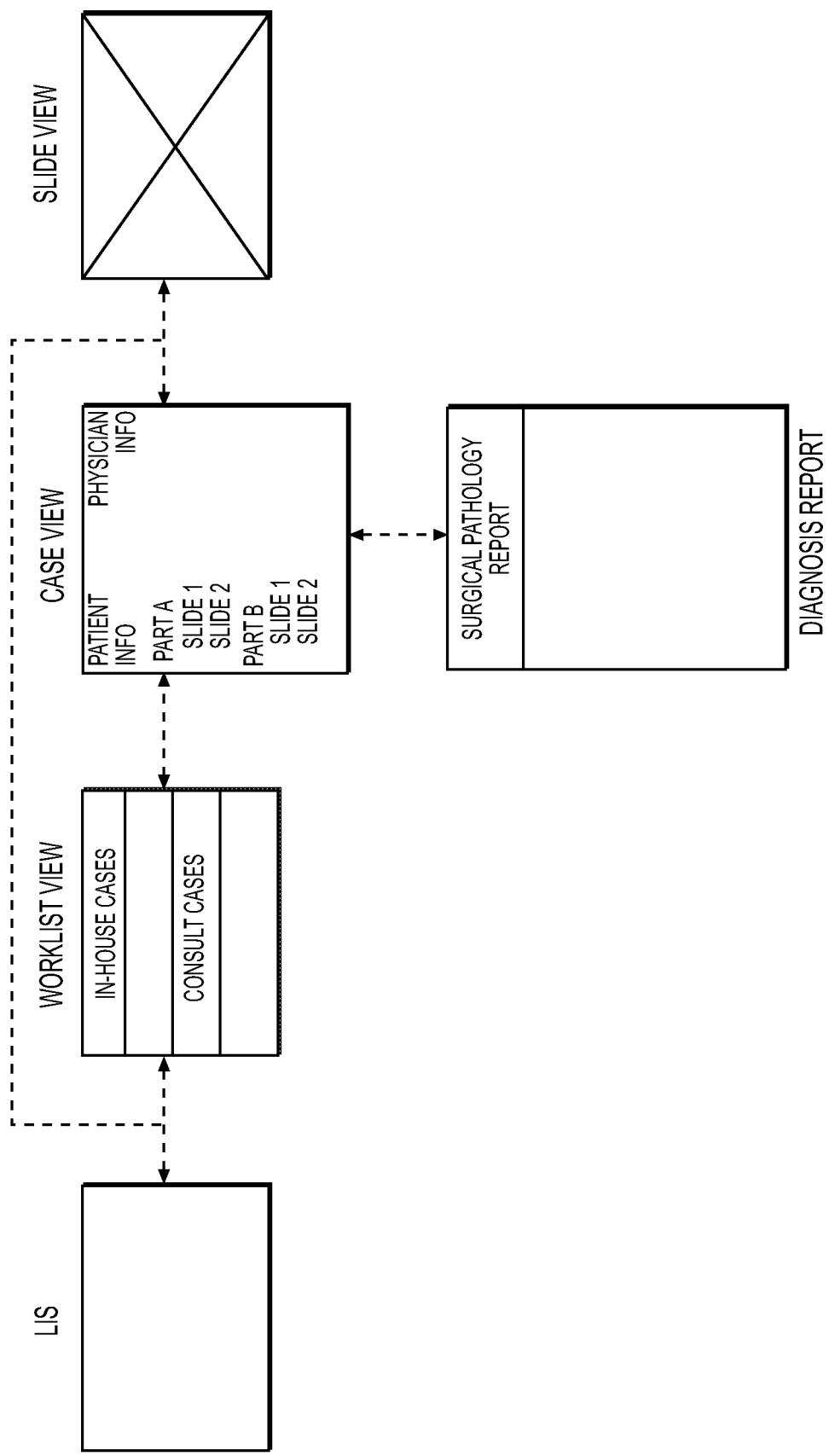
FIG. 13 illustrates an exemplary workflow of the viewing application tool 101, according to an exemplary embodiment of the present disclosure.

FIG. 13 illustrates an exemplary workflow of the viewing application tool 101, according to an exemplary embodiment. The workflow may include a worklist, a case view, and/or a slide view as the modes in a user's (e.g., pathologist) workflow. As illustrated in FIG. 13, a diagnosis report may be output from the case view, which may include information necessary for a digital sign out.

Figure 14C:
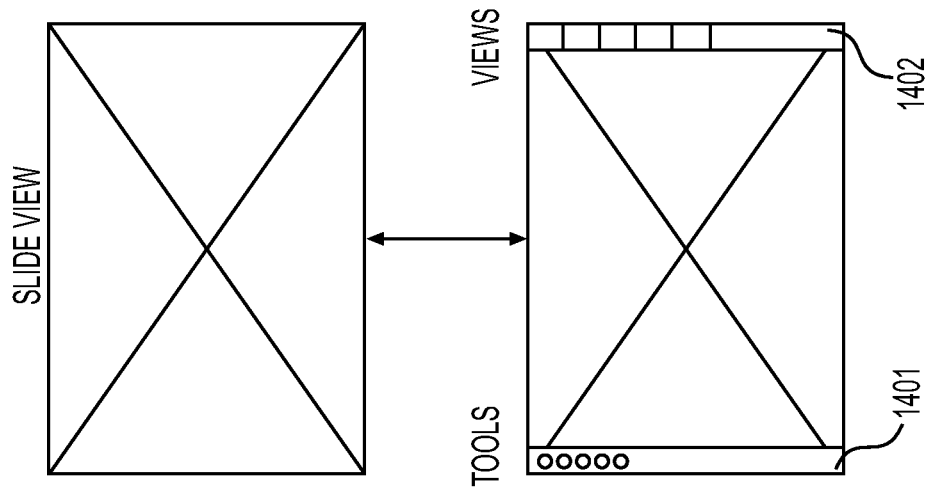
FIGS. 14A, 14B, and 14C illustrate exemplary outputs for a slide view of the viewing application tool 101, according to an exemplary embodiment of the present disclosure.
Figure 14B:
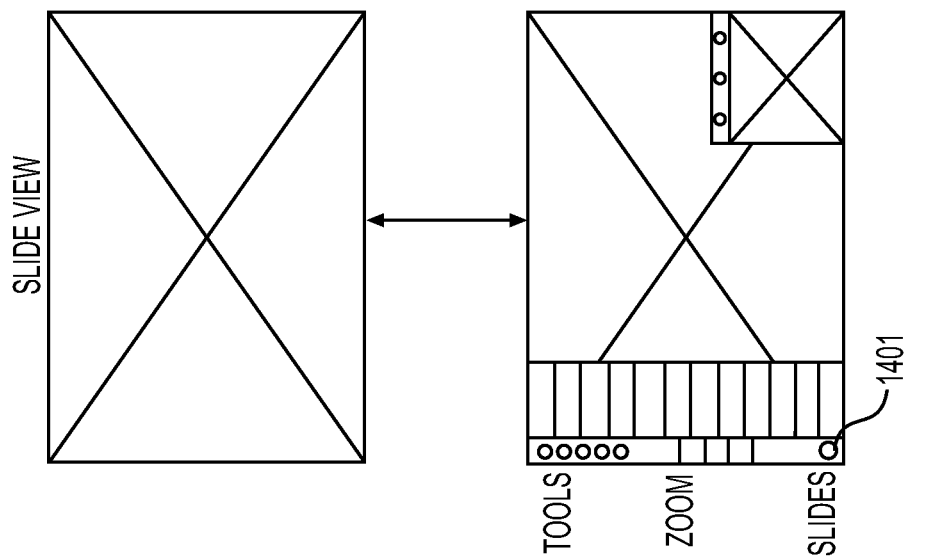
Figure 14A:
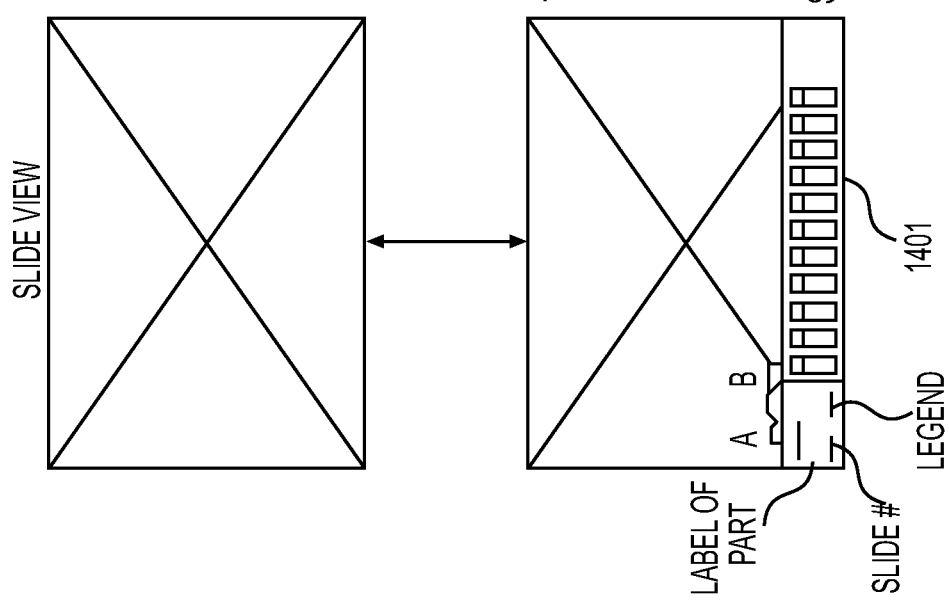

FIGS. 14A, 14B, and 14C illustrate exemplary outputs for the slide view of the viewing application tool 101, according to an exemplary embodiment. For example, as illustrated at the bottom of FIG. 14A, the slide view toolbar 1401 may be positioned at the bottom of the display with a vertical orientation of the slides. The slides may be grouped by part, and may display relevant case information within that context. As illustrated in FIG. 14B, a toolbar 1401 may be positioned at a left side of the display, in which the toolbar may include menu items such as tools, a zoom function, and thumbnail slides. As illustrated in FIG. 14C, two vertical toolbars 1401 and 1402 may be positioned on the left and right side of the screen, which may allow easy access to a variety of functions for a touch screen device (e.g., tools and/or views).

Figure 15:
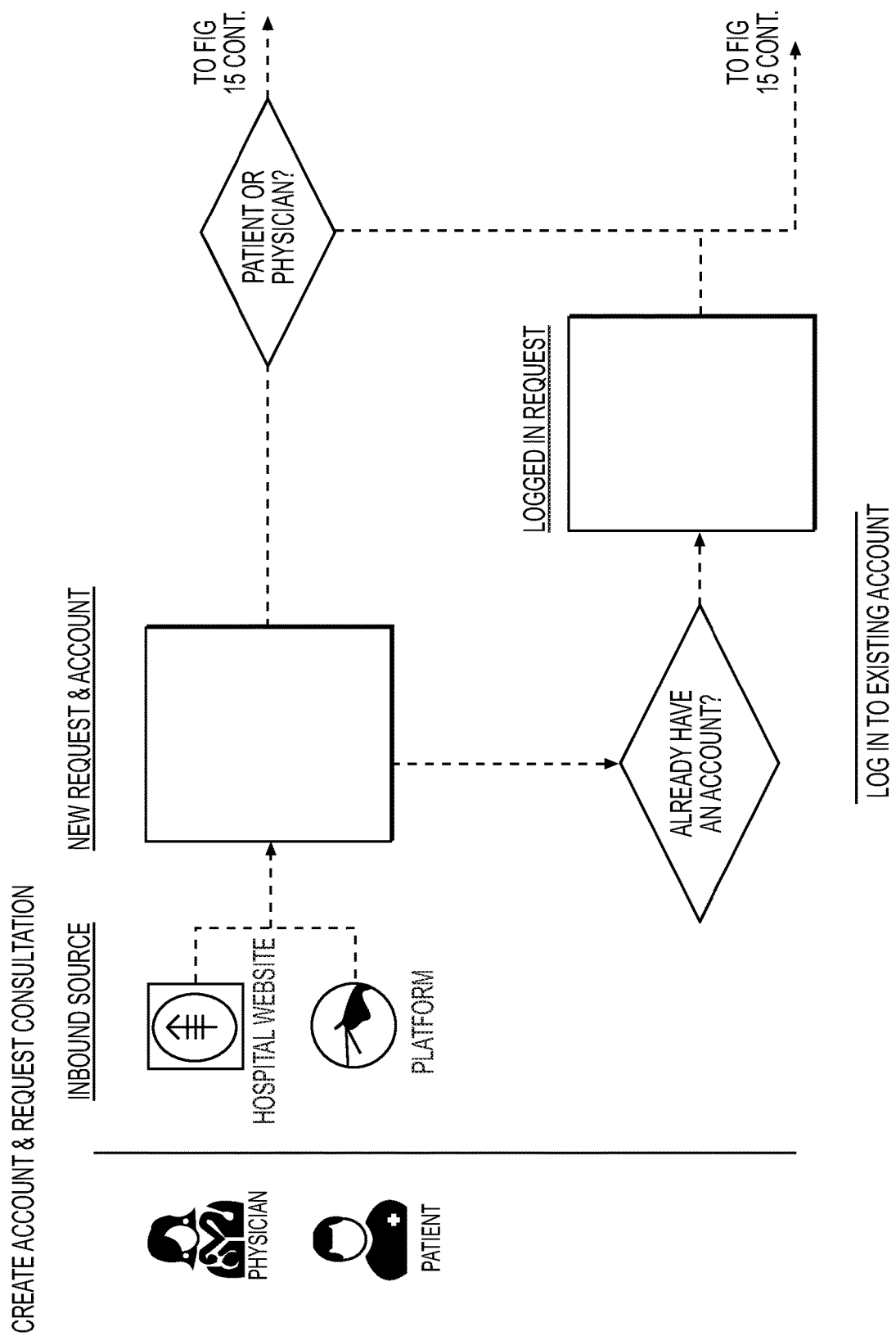
FIG. 15 illustrates an exemplary workflow for creating accounts for new users and requesting a consultation, according to an exemplary embodiment of the present disclosure.

FIG. 15 illustrates an exemplary workflow for creating accounts for new users (e.g., patients, physicians, etc.) to request and receive a consultation, according to an exemplary embodiment. A request to create a new account may be submitted through a hospital website and/or through the viewing application tool 101. Once an account is created, pathologists may send notes along with annotated images to quickly consult about any areas of interest on a slide. Patients may also receive consult information from pathologists and/or billing information related to their case. If the user is a physician, the billing options may be different based on whether the billed party is a referring physician, a patient, and/or an insurance carrier. If the user is a patient, the patient may be billed directly or through an insurance carrier.

Figure 16:
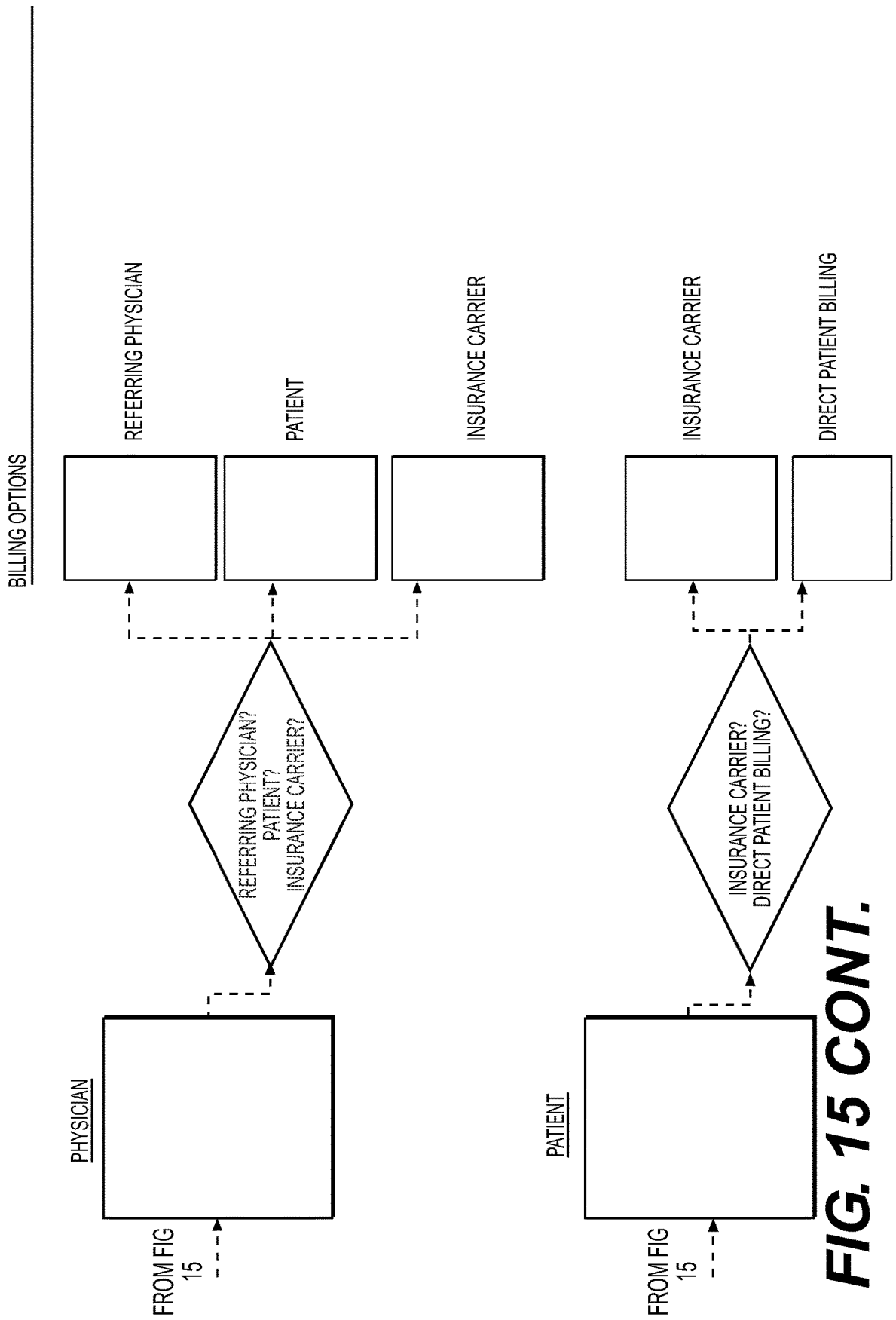
FIGS. 16A and 16B illustrate exemplary outputs for a pathology consultation dashboard, according to an exemplary embodiment of the present disclosure.

FIGS. 16A and 16B illustrate exemplary outputs for a pathology consultation dashboard, according to an exemplary embodiment. As illustrated in FIG. 16A, the new requests and accessioned consults may include patient name, referring physician, outside ID, internal ID, institution, date requested, status, date updated, and/or a link to additional details. The consultation dashboard may include functionality for selecting slides to send, a send slide dialogue box, a consult request note, consult attachments, and/or a consultation log. As illustrated in FIG. 16B, the consultation requests may include a patient name, referring physician, institution, date requested, status, date updated, and/or a link to further details about the request.

Figure 17:
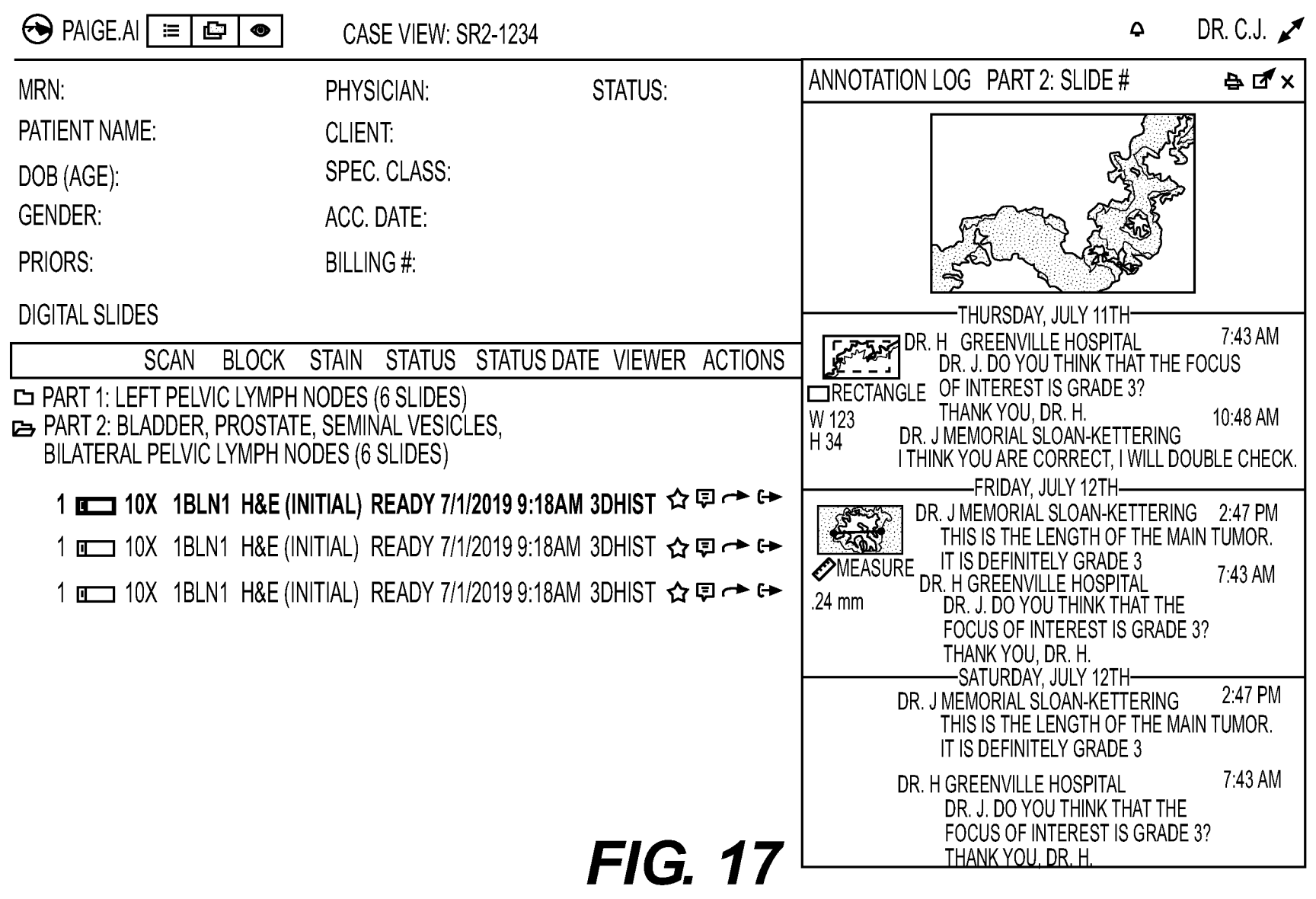

FIG. 17 illustrates an exemplary output of a case view for the viewing application tool 101, according to an exemplary embodiment. The case view may include all of the information necessary for a digital signet workflow. Additionally, as illustrated in FIG. 17, the annotation log may be integrated into the case view.

Figure 18:
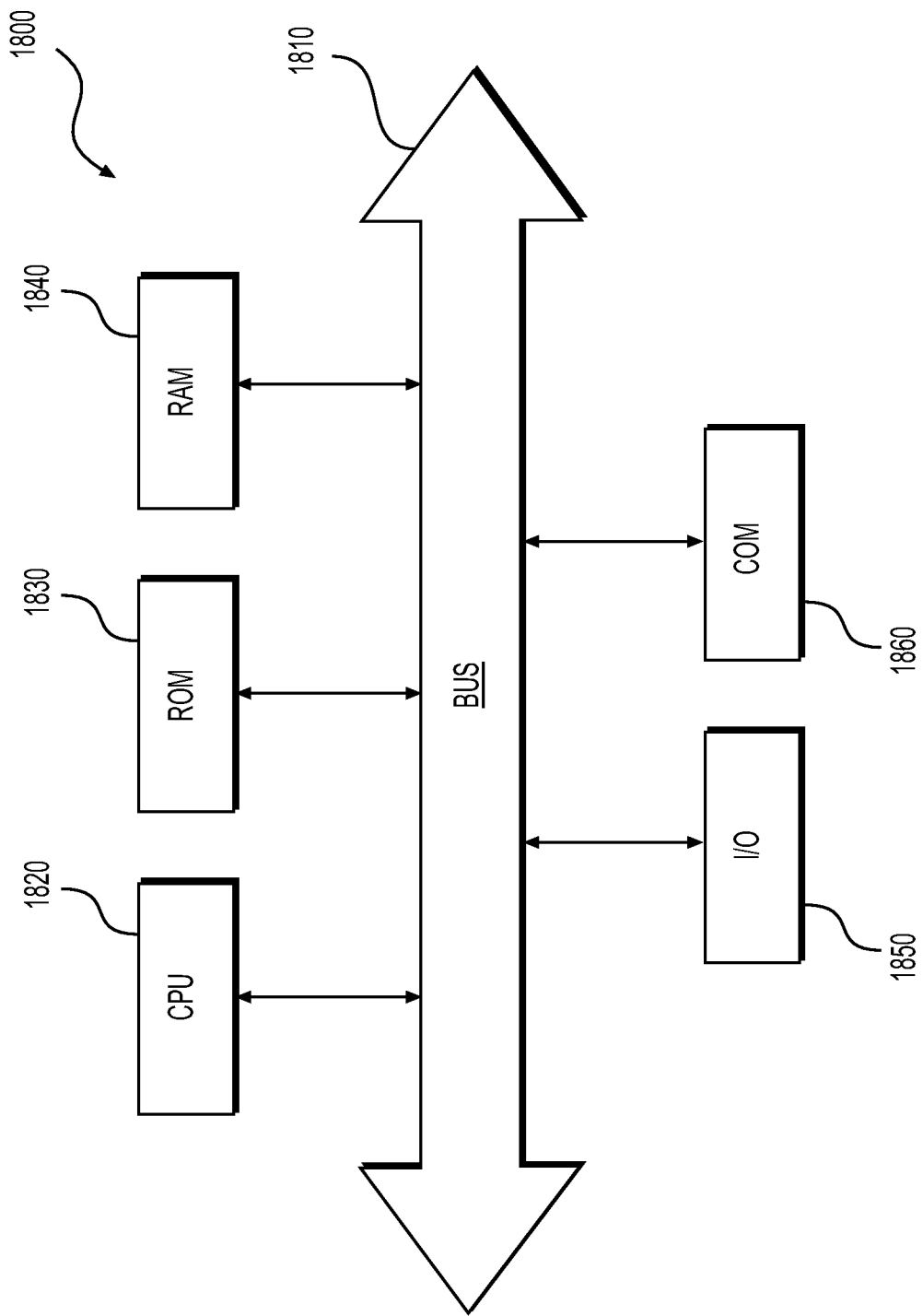
FIG. 18 depicts an example system that may execute techniques presented herein.

As shown in FIG. 18, device 1800 may include a central processing unit (CPU) 1820. CPU 1820 may be any type of processor device including, for example, any type of special purpose or a general-purpose microprocessor device. As will be appreciated by persons skilled in the relevant art, CPU 1820 also may be a single processor in a multi-core/multi-processor system, such system operating alone, or in a cluster of computing devices operating in a cluster or server farm. CPU 1820 may be connected to a data communication infrastructure 1810, for example, a bus, message queue, network, or multi-core message-passing scheme.

Device 1800 also may include a main memory 1840, for example, random access memory (RAM), and also may include a secondary memory 1830. Secondary memory 1830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1830 may include other similar means for allowing computer programs or other instructions to be loaded into device 1800.

Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1800.

Device 1800 also may include a communications interface ("COM") 1860. Communications interface 1860 allows software and data to be transferred between device 1800 and external devices. Communications interface 1860 may include a modem, a network interface (such as an Ethernet card), a communications port, a PCMCIA slot and card, or the like. Software and data transferred via communications interface 1860 may be in the form of signals, which may be electronic, electromagnetic, optical, or other signals capable of being received by communications interface 1860. These signals may be provided to communications interface 1860 via a communications path of device 1800, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1800 also may include input and output ports 1850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware.

The tools, modules, and functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention will be apparent to those skilled in the art from consideration of the specification and practice of the invention disclosed herein. It is intended that the specification and examples be considered as exemplary only.

What is claimed is:

1. A computer-implemented method for analyzing an electronic image corresponding to a specimen, the method comprising:

receiving a first target electronic image corresponding to a target specimen, the target specimen comprising a tissue sample of a patient;

applying a machine learning system to the first target electronic image to determine at least one characteristic of the target specimen and/or at least one characteristic of the first target electronic image, the at least one characteristic comprising specimen information and/or a biomarker, the machine learning system having been generated by processing a plurality of training images to predict the at least one characteristic, the training images comprising algorithmically generated training images, the algorithmically generated training images comprising input images that have been augmented to include added image noise, image flipping, and/or image distortions;

determining, by the machine learning system, a predicted likelihood, using a heuristic or a classifier based on an uncertainty estimation, that a location contains a biomarker, the biomarker comprising an over-expression of a protein and/or gene product, amplification, or mutations of specific genes;

outputting the first target electronic image identifying an area of interest based on the at least one characteristic of the target specimen and/or the at least one characteristic of the first target electronic image by displaying a heat map overlay on the first target electronic image based on the predicted likelihood determined by the machine learning system that the location contains the biomarker, the heat map overlay being displayed transparently or translucently over underlying tissue;

receiving a second target electronic image associated with the target specimen;

determining, by the machine learning system, a first portion of the target specimen associated with the first target electronic image;

determining, by the machine learning system, a second portion of the target specimen associated with the second target electronic image;

identifying, by the machine learning system, whether the first portion and the second portion are identical or overlapping; and in response to identifying that the first portion and the second portion are identical or overlapping, simultaneously displaying a first representation of the first target electronic image and a second representation of the second target electronic image in predetermined proximity to each other.

2. The computer-implemented method of claim 1, wherein the heat map overlay comprises shading and/or coloration based on the predicted likelihood that the location contains a biomarker.

3. The computer-implemented method of claim 1, further comprising:

displaying a magnification window, wherein the magnification window comprises a selectable icon for toggling the heat map overlay onto a magnified image.

4. The computer-implemented method of claim 1, further comprising:

displaying a slide tray tool identifying an overview of the target specimen on the first target electronic image;

applying the machine learning system to the first target electronic image to determine whether a part of the target specimen contains a biomarker; and in response to determining the part contains a biomarker, presenting an indicator of the biomarker in the slide tray tool.

5. The computer-implemented method of claim 1, further comprising: displaying an annotation log comprising an indicator identifying the area of interest and a consultation request related to the area of interest.

6. The computer-implemented method of claim 1, further comprising:
- determining, by applying machine learning techniques, whether there exists an area of interest associated with the first target electronic image and/or an area of interest associated with the second target electronic image;
- in response to determining the area of interest associated with the first target electronic image exists, displaying an indicator associated with the first representation of the first target electronic image; and
- in response to determining the area of interest associated with the second target electronic image exists, displaying an indicator associated with the second representation of the second target electronic image.

7. The computer-implemented method of claim 1, further comprising displaying a magnification window moving over the first target electronic image in response to a user input.

8. The method of claim 1, further comprising:
- displaying a magnification window over at least a portion that is being magnified of the first target electronic image; and
- presenting, in the magnification window, a magnified image of the target specimen at a magnification level that is different than a magnification level of the first target electronic image,
- wherein the magnification window comprises one or more selectable icons that change the magnification level in the magnification window.

9. The method of claim 1, further including:
- receiving a plurality of target electronic images associated with the target specimen;
- determining, by the machine learning system, one or more portions of the target specimen associated with the plurality of target electronic image;
- determining, by the machine learning system, whether the one or more portions of the target specimen of the plurality of target electronic images are identical or overlapping; and
- in response to determining that any of the one or more portions of the target specimen of the plurality of target electronic images are identical or overlapping, simultaneously displaying target electronic images which include identical or overlapping portions in predetermined proximity to each other.

10. The method of claim 1, further including:
- the machine learning system may analyze all of the first target electronic image and all of the second target electronic image and determine whether any areas of either image overlap or are identical; and
- upon determining one or more areas overlap or are identical, displaying the first target electronic image and second target electronic image in predetermined proximity to each other.

11. A system for analyzing an electronic image corresponding to a specimen, the system comprising:
- at least one memory storing instructions; and
- at least one processor executing the instructions to perform operations comprising:
  - receiving a first target electronic image corresponding to a target specimen, the target specimen comprising a tissue sample of a patient;
  - applying a machine learning system to the first target electronic image to determine at least one characteristic of the target specimen and/or at least one characteristic of the first target electronic image, the at least one characteristic comprising specimen information and/or a biomarker, the machine learning system having been generated by processing a plurality of training images to predict the at least one characteristic, the training images comprising algorithmically generated training images, the algorithmically generated training images comprising input images that have been augmented to include added image noise, image flipping, and/or image distortions;
  - determining, by the machine learning system, a predicted likelihood, using a heuristic or a classifier based on an uncertainty estimation, that a location contains a biomarker, the biomarker comprising an over-expression of a protein and/or gene product, amplification, or mutations of specific genes;
  - outputting the first target electronic image identifying an area of interest based on the at least one characteristic of the target specimen and/or the at least one characteristic of the first target electronic image by displaying a heat map overlay on the first target electronic image based on the predicted likelihood determined by the machine learning system that the location contains the biomarker, the heat map overlay being displayed transparently or translucently over underlying tissue receiving a second target electronic image corresponding to the target specimen;
  - receiving a second target electronic image associated with the target specimen;
  - determining, by the machine learning system, a first portion of the target specimen associated with the first target electronic image;
  - determining, by the machine learning system, a second portion of the target specimen associated with the second target electronic image;
  - identifying, by the machine learning system, whether the first portion and the second portion are identical or overlapping; and
  - in response to identifying that the first portion and the second portion are identical or overlapping, simultaneously displaying a first representation of the first target electronic image and a second representation of the second target electronic image in predetermined proximity to each other.

12. The system of claim 11, wherein the heat map overlay comprises shading and/or coloration based on the predicted likelihood that the location contains the biomarker.

13. The system of claim 11, further comprising:
- displaying a magnification window, wherein the magnification window comprises a selectable icon for toggling the heat map overlay onto a magnified image.

14. The system of claim 11, the operations further comprising:
- displaying a slide tray tool identifying an overview of the target specimen on the first target electronic image;
- applying the machine learning system to the first target electronic image to determine whether a part of the target specimen contains the biomarker; and
- in response to determining the part contains a biomarker, presenting an indicator of the biomarker in the slide tray tool.

15. The system of claim 11, the operations further comprising: displaying an annotation log comprising an indicator identifying the area of interest and a consultation request related to the area of interest.

16. The system of claim 11, the operations further comprising:

determining, by applying machine learning techniques, whether there exists an area of interest associated with the first target electronic image and/or an area of interest associated with the second target electronic image;

in response to determining the area of interest associated with the first target electronic image, displaying an indicator associated with the first representation of the first target electronic image; and in response to determining the area of interest associated with the second target electronic image, displaying an indicator associated with the second representation of the second target electronic image.

17. The system of claim 11, the operations further comprising displaying a magnification window moving over the first target electronic image in response to a user input.

18. A non-transitory computer-readable medium storing instructions that, when executed by a processor, cause the processor to perform a method for analyzing an electronic image corresponding to a specimen, the method comprising:

receiving a first target electronic image corresponding to a target specimen, the target specimen comprising a tissue sample of a patient;

applying a machine learning system to the first target electronic image to determine at least one characteristic of the target specimen and/or at least one characteristic of the first target electronic image, the at least one characteristic comprising specimen information and/or a biomarker, the machine learning system having been generated by processing a plurality of training images to predict the at least one characteristic, the training images comprising algorithmically generated training images, the algorithmically generated training images comprising input images that have been augmented to include added image noise, image flipping, and/or image distortions;

determining, by the machine learning system, a predicted likelihood, using a heuristic or a classifier based on an uncertainty estimation, that a location contains a biomarker, the biomarker comprising an over-expression of a protein and/or gene product, amplification, or mutations of specific genes;

outputting the first target electronic image identifying an area of interest based on the at least one characteristic of the target specimen and/or the at least one characteristic of the first target electronic image by displaying a heat map overlay on the first target electronic image based on the predicted likelihood determined by the machine learning system that the location contains the biomarker, the heat map overlay being displayed transparently or translucently over underlying tissue;

receiving a second target electronic image associated with the target specimen;

determining, by the machine learning system, a first portion of the target specimen associated with the first target electronic image;

determining, by the machine learning system, a second portion of the target specimen associated with the second target electronic image;

identifying, by the machine learning system, whether the first portion and the second portion are identical or overlapping; and in response to identifying that the first portion and the second portion are identical or overlapping, simultaneously displaying a first representation of the first target electronic image and a second representation of the second target electronic image in predetermined proximity to each other.

19. The non-transitory computer-readable medium of claim 18, wherein the heat map overlay comprises shading and/or coloration based on the predicted likelihood that the location contains a biomarker.

20. The non-transitory computer-readable medium of claim 18, wherein the method further comprises displaying a magnification window moving over the first target electronic image in response to a user input.

* * * * *